US012627786B2

(12) United States Patent
Nims et al.

(10) Patent No.: US 12,627,786 B2
(45) Date of Patent: *May 12, 2026

(54) SINGLE 2D IMAGE CAPTURE SYSTEM, PROCESSING AND DISPLAY OF 3D DIGITAL IMAGE

(71) Applicants: Jerry Nims, Sandy Springs, GA (US); William M. Karszes, Hilton Head, SC (US); Samuel Pol, Lawrenceville, GA (US)

(72) Inventors: Jerry Nims, Sandy Springs, GA (US); William M. Karszes, Hilton Head, SC (US); Samuel Pol, Lawrenceville, GA (US)

(*) Notice: Subject to any disclaimer, the term of this patent is extended or adjusted under 35 U.S.C. 154(b) by 43 days.

This patent is subject to a terminal disclaimer.

(21) Appl. No.: 18/922,152

(22) Filed: Oct. 21, 2024

(65) Prior Publication Data

US 2025/0047823 A1 Feb. 6, 2025

Related U.S. Application Data

(63) Continuation-in-part of application No. 18/790,734, filed on Jul. 31, 2024, and a continuation-in-part of
(Continued)

(51) Int. Cl.
*H04N 13/243* (2018.01)
*H04N 13/172* (2018.01)
(Continued)

(52) U.S. Cl.
CPC ......... *H04N 13/221* (2018.05); *H04N 13/172* (2018.05); *H04N 13/264* (2018.05); *H04N 13/268* (2018.05)

(58) Field of Classification Search
CPC ............. H04N 13/243; H04N 5/23222; H04N 13/128; H04N 13/156; H04N 13/271;
(Continued)

(56) References Cited

U.S. PATENT DOCUMENTS 4,037,950 A * 7/1977 Lo .......................... G03B 35/00
352/58
8,363,090 B1 * 1/2013 Sayre ................... H04N 13/128
348/42
(Continued)

*Primary Examiner* — Tung T Vo
(74) *Attorney, Agent, or Firm* — Mathew L. Grell, Esq.; Grell & Watson Patent Attorneys LLC

(57) ABSTRACT

A system to capture a two dimensional digital source image of a scene by a user, including a smart device having a memory device for storing an instruction, a processor in communication with the memory and configured to execute the instruction, a digital image capture device in communication with the processor, said processor configured to capture a first two dimensional digital source image of the scene, said processor configured to execute an instruction to generate a second two dimensional digital image of the scene from said first two dimensional digital image of the scene via a camera angle rotation of between 1-180 degrees of said first two dimensional digital image of the scene, and a display in communication with the processor, the display configured to display a multidimensional digital image, add audio file thereto, and create a NFT.

26 Claims, 22 Drawing Sheets

Related U.S. Application Data application No. 18/611,420, filed on Mar. 20, 2024, and a continuation-in-part of application No. 18/415, 371, filed on Jan. 17, 2024, now Pat. No. 12,341,945, and a continuation-in-part of application No. 17/834, 212, filed on Jun. 7, 2022, now Pat. No. 12,126,896.

(51) Int. Cl.

| | |
|---|---|
| *H04N 13/221* | (2018.01) |
| *H04N 13/264* | (2018.01) |
| *H04N 13/268* | (2018.01) |
| *H04N 13/302* | (2018.01) |
| *H04N 13/398* | (2018.01) |

(58) Field of Classification Search

CPC .. H04N 13/296; H04N 13/302; H04N 13/398; H04N 5/232941; H04N 5/2258; H04N 13/221; H04N 13/172; H04N 13/264; H04N 13/268; H04N 13/305; H04N 13/279

USPC .......................................................... 348/46

See application file for complete search history.

(56) References Cited

U.S. PATENT DOCUMENTS

| | | | | |
|---|---|---|---|---|
| 8,952,958 | B1* | 2/2015 | Low | H04N 13/296 |
| | | | | 345/474 |
| 11,528,464 | B2* | 12/2022 | Roulet | H04N 13/332 |
| 2006/0023197 | A1* | 2/2006 | Joel | G03B 35/24 |
| | | | | 355/77 |
| 2011/0098083 | A1* | 4/2011 | Lablans | G03B 35/00 |
| | | | | 455/556.1 |
| 2012/0113100 | A1* | 5/2012 | Niioka | G02B 30/27 |
| | | | | 345/419 |
| 2012/0120331 | A1* | 5/2012 | Oka | G02B 30/28 |
| | | | | 349/15 |
| 2013/0038701 | A1* | 2/2013 | Hung | H04N 13/221 |
| | | | | 348/E13.074 |
| 2014/0192282 | A1* | 7/2014 | Wu | G02B 30/28 |
| | | | | 349/200 |
| 2016/0088287 | A1* | 3/2016 | Sadi | H04N 13/261 |
| | | | | 348/43 |
| 2016/0091720 | A1* | 3/2016 | Stafford | G02B 27/0172 |
| | | | | 345/8 |
| 2016/0227184 | A1* | 8/2016 | Nims | H04N 13/194 |
| 2016/0227185 | A1* | 8/2016 | Nims | H04N 13/128 |
| 2017/0171534 | A1* | 6/2017 | Kondiparthi | H04N 13/366 |
| 2017/0257614 | A1* | 9/2017 | Wang | H04N 13/122 |
| 2018/0288241 | A1* | 10/2018 | Nims | H04N 13/31 |
| 2019/0082110 | A1* | 3/2019 | Jin | H04N 5/23296 |
| 2019/0082114 | A1* | 3/2019 | Jeon | H04N 5/23241 |
| 2019/0188872 | A1* | 6/2019 | Aflalo | G06T 7/593 |
| 2020/0020075 | A1* | 1/2020 | Khwaja | G06T 5/002 |
| 2020/0267328 | A1* | 8/2020 | Jeung | H05K 1/181 |
| 2020/0275031 | A1* | 8/2020 | Park | H04N 13/243 |
| 2020/0278602 | A1* | 9/2020 | Rhee | H04N 5/23245 |
| 2021/0392314 | A1* | 12/2021 | Nims | G06F 1/1686 |
| 2022/0051427 | A1* | 2/2022 | Nims | G01S 17/894 |
| 2025/0014202 | A1* | 1/2025 | Nims | G01S 17/894 |
| 2025/0055967 | A1* | 2/2025 | Nims | H04N 13/122 |
| 2025/0139866 | A1* | 5/2025 | Nims | H04N 13/268 |
| 2025/0233971 | A1* | 7/2025 | Nims | H04N 13/128 |

* cited by examiner

350

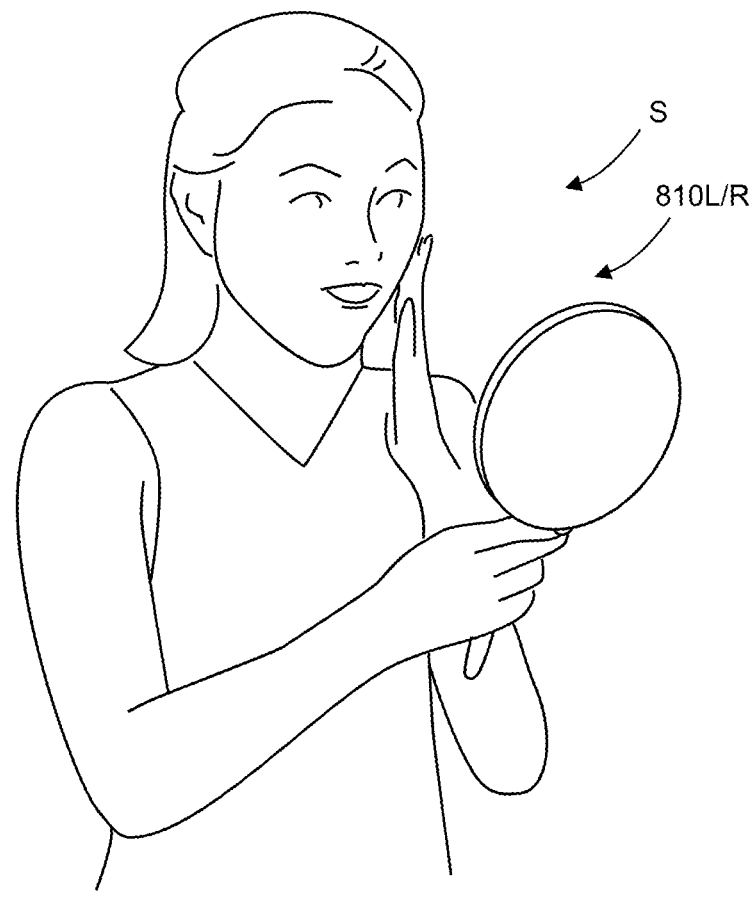
Fig. 7A1

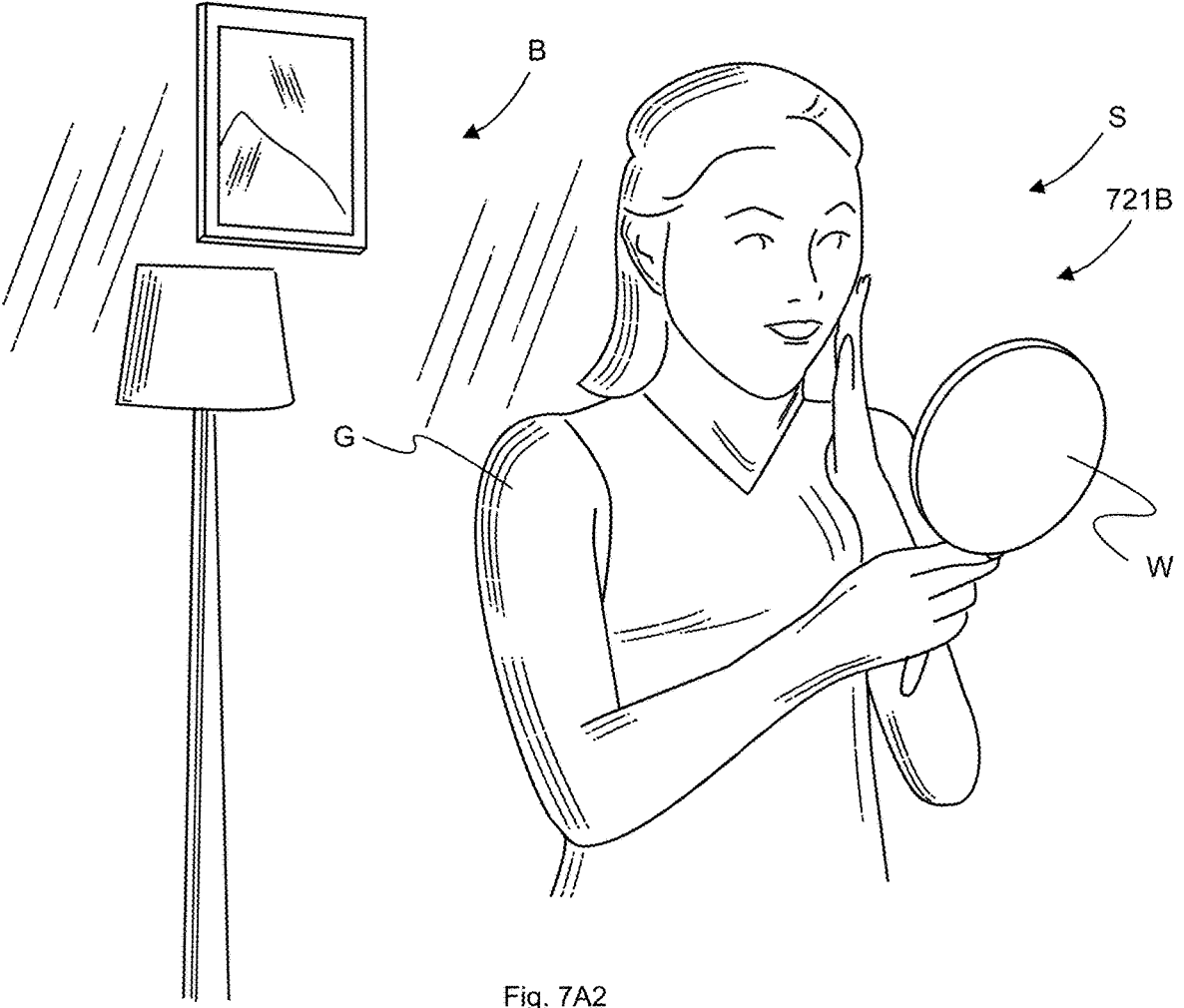
Fig. 7A2

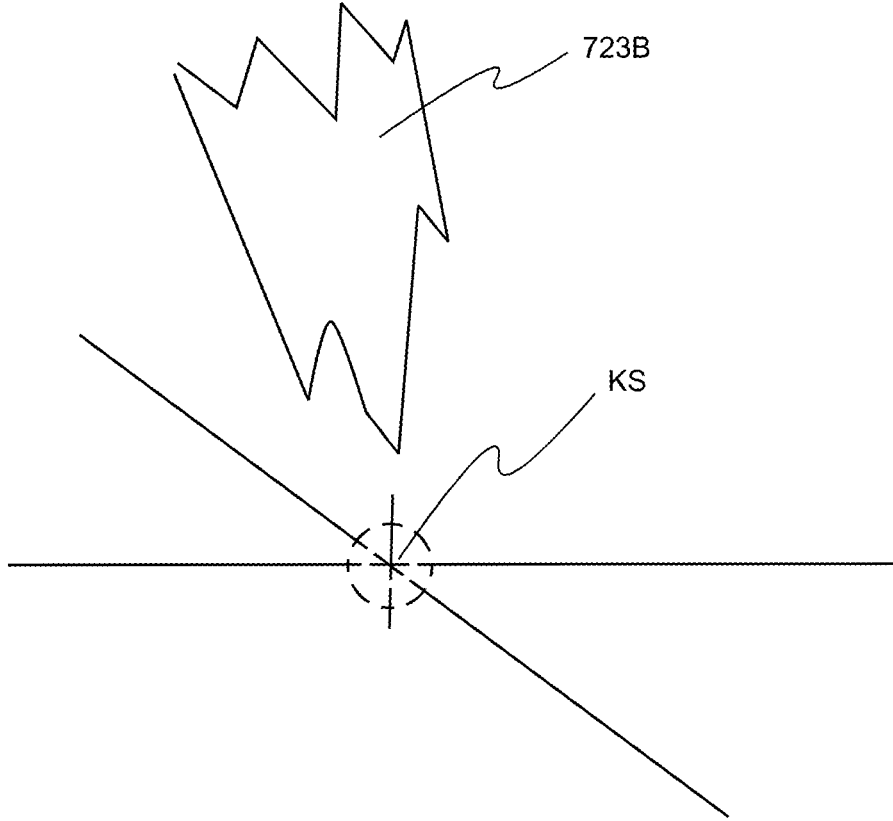
Fig. 7A3

$$\frac{R}{K_s} = \tan 30°$$

$$R = K_s \tan 30°$$

Calculate Radius, R, of Circle of Comfort $K_s$ $30°$ $T_R$

Calculate Optimum Movement of Image Capture Device $15°$ $$\frac{T_R}{K_s} = \tan 15°$$

$$T_R = K_s \tan 15°$$

$15°$

Calculate Optimum Back Layer

B $$\tan 15° = R/B$$

$$B = R/\tan 15°$$

$$B = \frac{K_s \tan 30°}{\tan 15°}$$

R $$\text{ratio of near plane / far plane} = \frac{K_s}{K_s \tan 30°} * \tan 15° = 2.15$$

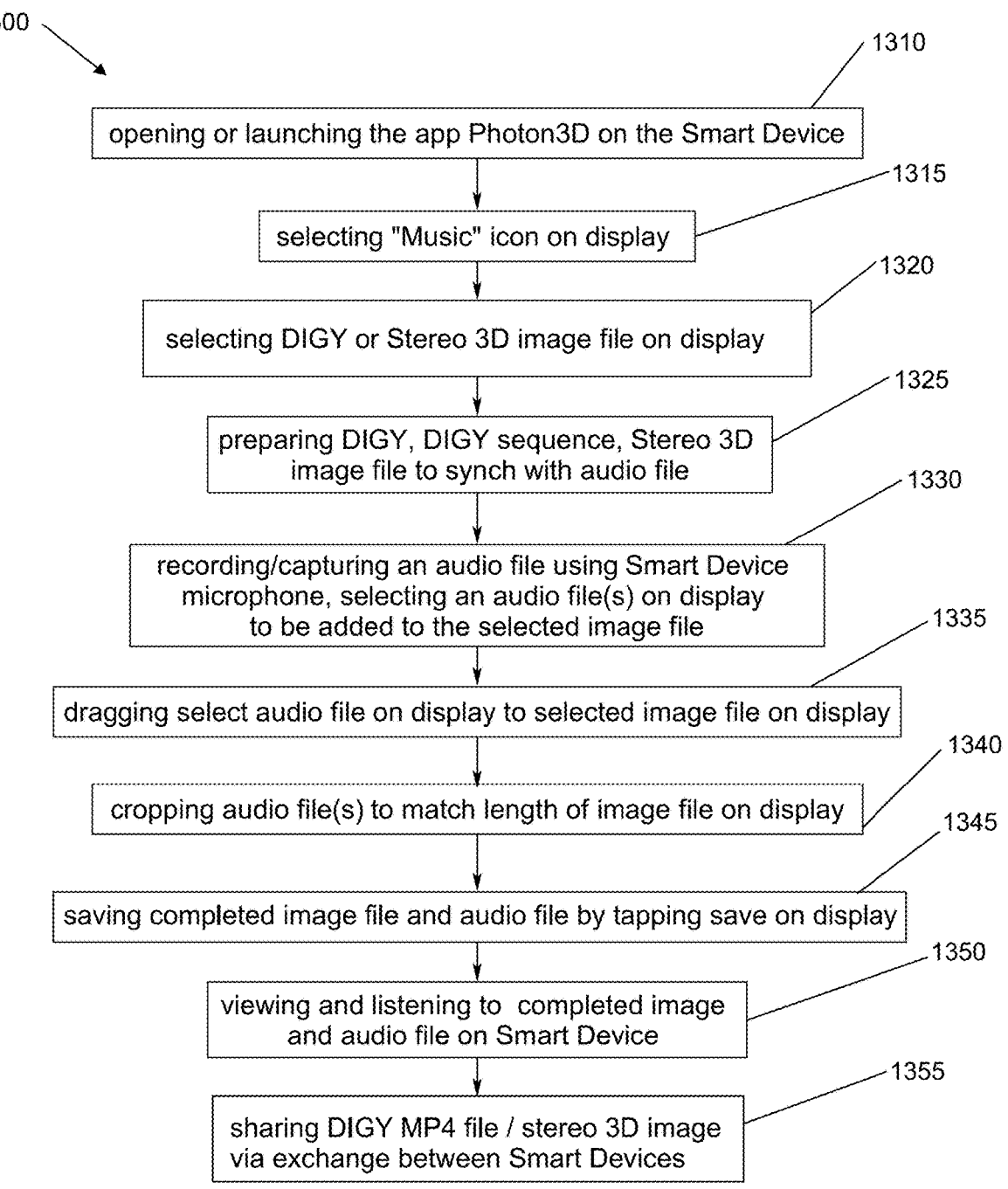

1300

1310
opening or launching the app Photon3D on the Smart Device 1315
selecting "Music" icon on display 1320
selecting DIGY or Stereo 3D image file on display 1325
preparing DIGY, DIGY sequence, Stereo 3D image file to synch with audio file 1330
recording/capturing an audio file using Smart Device microphone, selecting an audio file(s) on display to be added to the selected image file 1335
dragging select audio file on display to selected image file on display 1340
cropping audio file(s) to match length of image file on display 1345
saving completed image file and audio file by tapping save on display 1350
viewing and listening to  completed image and audio file on Smart Device 1355
sharing DIGY MP4 file / stereo 3D image via exchange between Smart Devices

Fig. 13

SINGLE 2D IMAGE CAPTURE SYSTEM, PROCESSING AND DISPLAY OF 3D DIGITAL IMAGE

CROSS REFERENCE TO RELATED APPLICATIONS

To the full extent permitted by law, the present United States Non-Provisional patent application is a Continuation in Part of and claims priority to and the full benefit of, U.S. application Ser. No. 18/790,734 filed on Jul. 31, 2024 entitled "SINGLE 2D IMAGE CAPTURE SYSTEM, PROCESSING & DISPLAY OF 3D DIGITAL IMAGE"; U.S. application Ser. No. 18/415,371 filed on Jan. 17, 2024 entitled "2D Image Capture System & Display of 3D Digital Image"; U.S. application Ser. No. 18/611,420 filed on Mar. 20, 2024 entitled "2D Image Capture System & Display of 3D Digital Image"; U.S. application Ser. No. 17/834,212 filed on Jun. 7, 2022 entitled "2 DIGITAL IMAGE CAPTURE SYSTEM AND SIMULATING 3D DIGITAL IMAGE AND SEQUENCE", and is related to pending U.S. application Ser. No. 18/884,487 filed on Sep. 13, 2024 entitled "2D DIGITAL IMAGE CAPTURE SYSTEM, FRAME SPEED, AND SIMULATING 3D DIGITAL IMAGE SEQUENCE"; U.S. application Ser. No. 17/834,023 filed on Jun. 7, 2022 entitled "2 DIGITAL IMAGE CAPTURE SYSTEM AND SIMULATING 3D DIGITAL IMAGE AND SEQUENCE". The foregoing is incorporated herein by reference in their entirety.

FIELD OF THE DISCLOSURE

The present disclosure is directed to 2D image capture, image processing, and display of a 3D or multi-dimensional image.

BACKGROUND

The human visual system (HVS) relies on two dimensional images to interpret three dimensional fields of view. By utilizing the mechanisms with the HVS we create images/scenes that are comparable with the HVS.

Mismatches between the point at which the eyes must converge and the distance to which they must focus when viewing a 3D image have negative consequences. While 3D imagery has proven popular and useful for movies, digital advertising, many other applications may be utilized if viewers are enabled to view 3D images without wearing specialized glasses or a headset, which is a well-known problem. Misalignment in these systems results in jumping images, out of focus, or fuzzy features when viewing the digital multidimensional images. The viewing of these images can lead to headaches and nausea.

In natural viewing, images arrive at the eyes with varying binocular disparity, so that as viewers look from one point in the visual scene to another, they must adjust their eyes' vergence. The distance at which the lines of sight intersect is the vergence distance. Failure to converge at that distance results in double images. The viewer also adjusts the focal power of the lens in each eye (i.e., accommodates) appropriately for the fixated part of the scene. The distance to which the eye must be focused is the accommodative distance. Failure to accommodate to that distance results in blurred images. Vergence and accommodation responses are coupled in the brain, specifically, changes in vergence drive changes in accommodation and changes in accommodation drive changes in vergence. Such coupling is advantageous in natural viewing because vergence and accommodative distances are nearly always identical.

In 3D images, images have varying binocular disparity thereby stimulating changes in vergence as happens in natural viewing. But the accommodative distance remains fixed at the display distance from the viewer, so the natural correlation between vergence and accommodative distance is disrupted, leading to the so-called vergence-accommodation conflict. The conflict causes several problems. Firstly, differing disparity and focus information cause perceptual depth distortions. Secondly, viewers experience difficulties in simultaneously fusing and focusing on key subject within the image. Finally, attempting to adjust vergence and accommodation separately causes visual discomfort and fatigue in viewers.

Perception of depth is based on a variety of cues, with binocular disparity and motion parallax generally providing more precise depth information than pictorial cues. Binocular disparity and motion parallax provide two independent quantitative cues for depth perception. Binocular disparity refers to the difference in position between the two retinal image projections of a point in 3D space.

Conventional stereoscopic displays forces viewers to try to decouple these processes, because while they must dynamically vary vergence angle to view objects at different stereoscopic distances, they must keep accommodation at a fixed distance or else the entire display will slip out of focus. This decoupling generates eye fatigue and compromises image quality when viewing such displays.

Therefore, it is readily apparent that there is a recognizable unmet need for single 2D image capture system, processing & display of digital multi-dimensional image that may be configured to address at least some aspects of the problems discussed above.

SUMMARY

Briefly described, in an example embodiment, the present disclosure may overcome the above-mentioned disadvantages and may meet the recognized need for a system to capture a two dimensional digital source image of a scene by a user, including a smart device having a memory device for storing an instruction, a processor in communication with the memory and configured to execute the instruction, a digital image capture device in communication with the processor and the image capture device configured to capture a digital image of the scene, the processor to generate a depth map of the digital image of the scene, create a 3D infilled mesh from the depth map, assign a key subject to the 3D infilled mesh, apply a parallax, render a stereo pair of images from the 3D infilled mesh, and a display in communication with the processor, the display configured to display a multidimensional digital image of the stereo pair of images, storage of multidimensional digital image sequence and/or a multidimensional digital image via block chain, storage of audio files for playback while viewing the image file, storage of related verification documents authenticating image or audio file, transmission of stored files, block chain storage of such files, creation of non-fungible assets of such stored files, non-fungible token (NFT).

Accordingly, a feature of the digital multi-dimensional image system and methods of use is the ability to capture images of a scene with 2D capture devices positioned approximately an intraocular or interpupillary distance width IPD apart (distance between pupils of human visual system).

Accordingly, a feature of the digital multi-dimensional image system and methods of use is the ability to convert 2D image source of scene into multi-dimensional/multi-spectral images. The output image follows the rule of a "key subject point" maintained within an optimum parallax to maintain a clear and sharp image.

Accordingly, a feature of the digital multi-dimensional image system and methods of use is the ability to integrate viewing devices or other viewing functionality into the display, such as barrier screen, lenticular, arced, curved, trapezoid, parabolic, overlays, waveguides, black line and the like with an integrated LCD layer in an LED or OLED, LCD, OLED, and combinations thereof or other viewing devices.

Another feature of the digital multi-dimensional image platform based system and methods of use is the ability to produce digital multi-dimensional images that can be viewed on viewing screens, such as mobile and stationary phones, smart phones (including iPhone), tablets, computers, laptops, monitors and other displays and/or special output devices, directly without 3D glasses or a headset.

In an exemplary embodiment a system to capture a plurality of two dimensional digital source images of a scene by a user, including a smart device having a memory device for storing an instruction, a processor in communication with the memory and configured to execute the instruction, a plurality of digital image capture devices in communication with the processor and each image capture device configured to capture a digital image of the scene, the plurality of digital image capture devices positioned linearly in series within approximately an interpupillary distance, wherein a first digital image capture devices is centered proximate a first end of the interpupillary distance, a second digital image capture devices is centered on a second end of the interpupillary distance, and any remaining the plurality of digital image capture devices are evenly spaced therebetween, and a display in communication with the processor, the display configured to display a multidimensional digital image.

In another exemplary embodiment of a system to capture a plurality of two dimensional digital source images of a scene and transmit a modified pair of images to a plurality of users for viewing, having a first smart device having a first memory device for storing an instruction, a first processor in communication with the first memory device and configured to execute the instruction, a display in communication with the first processor, the display configured to display a multidimensional digital image, a second smart device having a second memory device for storing an instruction, a second processor in communication with the second memory device and configured to execute the instruction, a plurality of digital image capture devices in communication with the second processor and each image capture device configured to capture a digital image of the scene, the plurality of digital image capture devices positioned linearly in series within approximately an interpupillary distance width, wherein a first digital image capture devices is centered proximate a first end of the interpupillary distance width, a second digital image capture devices is centered on a second end of the interpupillary distance width, and any remaining the plurality of digital image capture devices are evenly spaced therebetween, and the second smart device in communication with the first smart device.

In another exemplary embodiment of a system to capture a two dimensional digital image of a scene by a user, process the images, and view a multidimensional digital image, the combined system including a memory device for storing an instruction, a processor in communication with the memory device configured to execute the instruction, a digital image capture device in communication with the processor configured to capture a first two dimensional digital image of the scene, the processor executes an instruction to save the first two dimensional digital image of the scene, the processor executes an instruction to select a key subject convergence point in the first two dimensional digital image of the scene, the processor executes an instruction to generate a second two dimensional digital image of the scene from the first two dimensional digital image of the scene via a camera angle rotation of between 1-180 degrees of the first two dimensional digital image of the scene, the processor executes an instruction to align the first two dimensional digital and the second two dimensional digital image of the scene horizontally and vertically, a display in communication with the processor having a micro optical lens, the display configured to display the multidimensional digital image, the micro optical lens is configured as a plurality of pixels having a refractive element integrated therein, the refractive element having a plurality of repeating series of sub-elements aligned as a single layer therewith the plurality of pixels, wherein each of the plurality of repeating series of sub-elements is configured having a cross-section shaped as a single layer having repeating flat sections and trapezoid sections, each of the trapezoid sections having an incline angle and a decline angle, the processor executes an instruction to interphase the first two dimensional digital and the second two dimensional digital image of the scene aligned about the key subject convergence point to correspond to the micro optical lens spacing to generate a multidimensional image of the scene, and the processor executes an instruction to display the multidimensional image of the scene on the display.

In another exemplary embodiment of a method of generating a multidimensional digital image of a scene from at least two 2D (two dimensional) digital images for a user, including providing a smart device having a memory device for storing an instruction, a processor in communication with the memory and configured to execute the instruction, a plurality of digital image capture devices in communication with the processor and each image capture device configured to capture a digital image of the scene, the plurality of digital image capture devices positioned linearly in series within approximately an interpupillary distance, wherein a first digital image capture devices is centered proximate a first end of the interpupillary distance, a second digital image capture devices is centered on a second end of the interpupillary distance, and any remaining the plurality of digital image capture devices are evenly spaced therebetween, and a display in communication with the processor, the display configured to display the multidimensional digital image and displaying the multidimensional digital image on the display.

In another exemplary embodiment of a method of generating a multidimensional digital image of a scene from a two dimensional digital image of a scene for a user, the method comprising the steps of providing a memory device for storing an instruction, a processor in communication with the memory device configured to execute the instruction, a digital image capture device in communication with the processor configured to capture a first two dimensional digital image of the scene, a display in communication with the processor having a micro optical lens, the micro optical lens is configured as a plurality of pixels having a refractive element integrated therein, the refractive element having a plurality of repeating series of sub-elements aligned as a single layer therewith the plurality of pixels, wherein each of the plurality of repeating series of sub-elements is configured having a cross-section shaped as a single layer having repeating flat sections and trapezoid sections, each of the trapezoid sections having an incline angle and a decline angle, the display configured to display the multidimensional digital image, capturing a first two dimensional digital image of the scene, saving the first two dimensional digital image of the scene, the processor executes an instruction to select a key subject convergence point in the first two dimensional digital image of the scene, generating a second two dimensional digital image of the scene from the first two dimensional digital image of the scene via a camera angle rotation of between 1-180 degrees of the first two dimensional digital image of the scene, aligning the first two dimensional digital and the second two dimensional digital image of the scene horizontally and vertically, interphasing the first two dimensional digital and the second two dimensional digital image of the scene aligned about the key subject convergence point to correspond to the micro optical lens spacing to generate a multidimensional image of the scene, and displaying the multidimensional image of the scene on the display.

A feature of the present disclosure may include a system having a single capture device, to capture a 2D source image or monocular image of a scene, the system labels and identifies the images based on the source capture device that captured the image.

A feature of the present disclosure may include a system having a display device configured from a stack of components, such as top glass cover, capacitive touch screen glass, polarizer, diffusers, and backlight. Moreover, an image source, such as LCD, such LED, ELED, PDP, QLED, and other types of display technologies. Furthermore, display device may include a lens array preferably positioned between capacitive touch screen glass and LCD panel stack of components, and configured to bend or refract light in a manner capable of displaying both a high quality 2D image and an interlaced stereo pair of left and right images as 3D or multidimensional digital image of scene.

A feature of the present disclosure may include other techniques to bend or refract light, such as barrier screen, lenticular, parabolic, overlays, waveguides, black line and the like.

A feature of the present disclosure may include a lens array having a cross-sectional view configured as a series of spaced apart trapezoid shaped lens.

A feature of the present disclosure is the ability to overcome the above defects via another important parameter to determine the convergence point or key subject point, since the viewing of an image that has not been aligned to a key subject point causes confusion to the human visual system and results in blur and double images.

A feature of the present disclosure is the ability to overcome the above defects via another important parameter to determine Circle of Comfort CoC, since the viewing of an image that has not been aligned to the Circle of Comfort CoC causes confusion to the human visual system and results in blur and double images.

A feature of the present disclosure is the ability to overcome the above defects via another important parameter to determine Circle of Comfort CoC fused with Horopter arc or points and Panum area, since the viewing of an image that has not been aligned to the Circle of Comfort CoC fused with Horopter arc or points and Panum area causes confusion to the human visual system and results in blur and double images.

A feature of the present disclosure is the ability to overcome the above defects via another important parameter to determine gray scale depth map, the system interpolates intermediate points based on the assigned points (closest point, key subject point, and furthest point) in a scene, the system assigns values to those intermediate points and renders the sum to a gray scale depth map. The gray scale map to generate volumetric parallax using values assigned to the different points (closest point, key subject point, and furthest point) in a scene. This modality also allows volumetric parallax or rounding to be assigned to singular objects within a scene.

A feature of the present disclosure is its ability to utilize a single 2D image (monocular) to create a second 2D image to utilize as a stereo pair.

A feature of the present disclosure is its ability to create a 3D infilled mesh from the depth map and single 2D image of the scene.

A feature of the present disclosure is its ability to assign a key subject or convergence point of the infilled mesh from the depth map and single 2D image of the scene.

A feature of the present disclosure is its ability to apply (ing) a parallax, specifically a rotational parallax, to the key subject convergence point of the infilled mesh from the depth map and single 2D image of the scene.

A feature of the present disclosure is its ability to render a multi-dimensional image from the parallax, specifically a rotational parallax, to the key subject or convergence point of the infilled mesh from the depth map and single 2D image of the scene A feature of the present disclosure is its ability to utilize a key subject algorithm to manually or automatically select the key subject of a scene displayed on a display.

A feature of the present disclosure is its ability to utilize an image alignment or edit algorithm to manually or automatically align two images of a scene for display.

A feature of the feature of the present disclosure is its ability to utilize an image translation algorithm to align the key subject point of the two images (stereo pair) of a scene for display.

A feature of the present disclosure is its ability to provide a display capable of displaying a multi-dimensional image using a lens array integrated therein the display wherein such lens array may be selected from the barrier screens, parabolic, lens array (whether arced, dome, trapezoid or the like), and/or waveguide, integrated LCD layer in an LED or OLED, LCD, OLED, and combinations thereof.

These and other features of the 2D image capture system, process & display of 3D or digital multi-dimensional image and methods of use will become more apparent to one skilled in the art from the prior Summary and following Brief Description of the Drawings, Detailed Description of exemplary embodiments thereof, and Claims when read in light of the accompanying Drawings or Figures.

BRIEF DESCRIPTION OF THE DRAWINGS

The present disclosure will be better understood by reading the Detailed Description of the Preferred and Selected Alternate Embodiments with reference to the accompanying drawing Figures, in which like reference numerals denote similar structure and refer to like elements throughout, and in which:

FIG. 5B is a cross-section diagram of an exemplary embodiment of an arced or curved shaped lens according to select embodiments of the instant disclosure, tracing RGB light there through;

FIG. 5C is a cross-section diagram of a prototype embodiment of a trapezoid shaped lens according to select embodiments of the instant disclosure, tracing RGB light there through;

FIG. 5D is a cross-section diagram of an exemplary embodiment of a dome shaped lens according to select embodiments of the instant disclosure, tracing RGB light there through;

FIG. 7A1 is a top view illustration of an exemplary embodiment of an image of a scene captured utilizing capture device shown in FIG. 3;

FIG. 7A2 is a top view illustration of an exemplary embodiment of a gray scale depth map of the image shown in FIG. 7A1;

FIG. 7A3 is a top view illustration of an exemplary embodiment of an infilled mesh and key subject of gray scale depth map of the image shown in FIG. 7A2;

FIG. 13 is an exemplary embodiment of a flow diagram of a method of selecting a sequence of DIGYs and adding an audio file thereto utilizing a computing device with image capture devices capture devices shown in FIG. 3.

Figure 1:
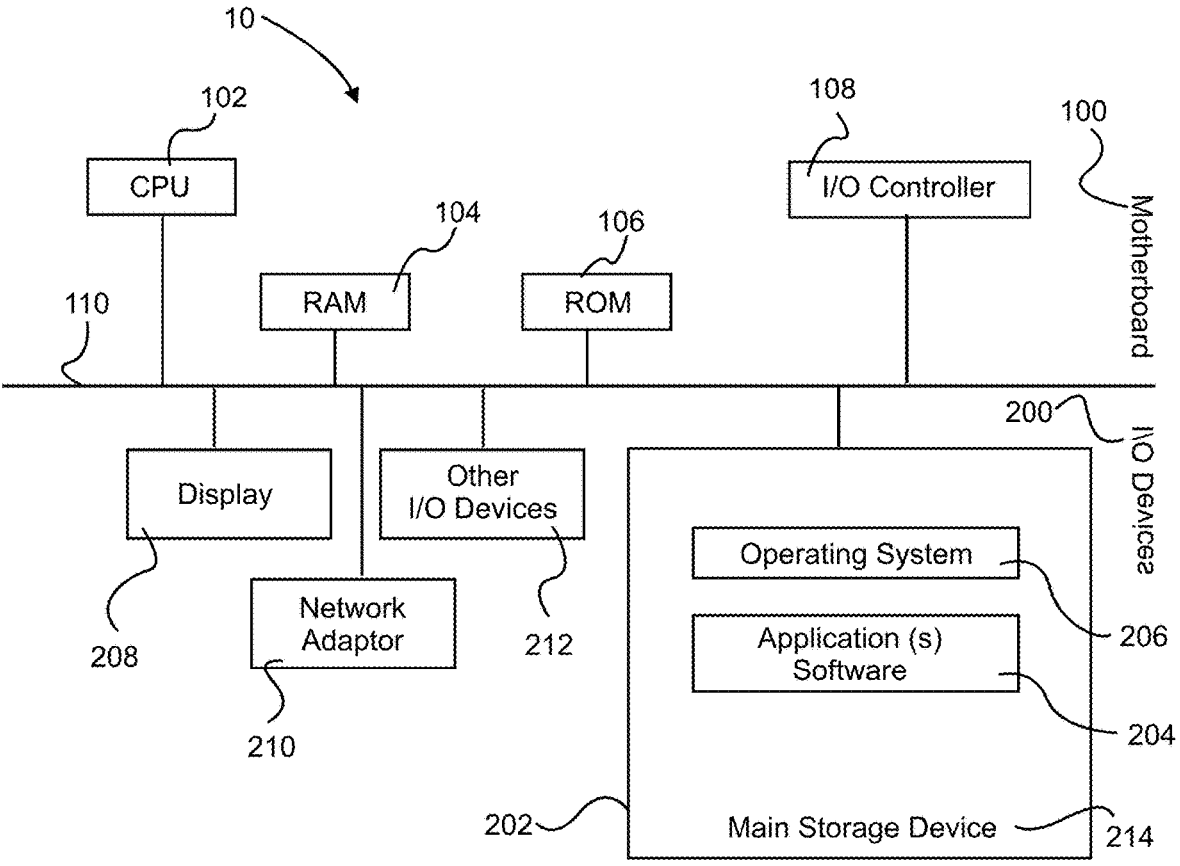
FIG. 1 is a block diagram of a computer system of the present disclosure.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

In describing the exemplary embodiments of the present disclosure, as illustrated in figures specific terminology is employed for the sake of clarity. The present disclosure, however, is not intended to be limited to the specific terminology so selected, and it is to be understood that each specific element includes all technical equivalents that operate in a similar manner to accomplish similar functions. The claimed invention may, however, be embodied in many different forms and should not be construed to be limited to the embodiments set forth herein. The examples set forth herein are non-limiting examples and are merely examples among other possible examples.

In order to understand the present disclosure certain variables need to be defined. The object field is the entire image being composed. The "key subject point" is defined as the point where the scene converges, i.e., the point in the depth of field that always remains in focus and has no parallax differential in the key subject point. The foreground and background points are the closest point and furthest point from the viewer, respectively. The depth of field is the depth or distance created within the object field (depicted distance from foreground to background). The principal axis is the line perpendicular to the scene passing through the key subject point. The parallax or binocular disparity is the difference in the position of any point in the first and last image after the key subject alignment. In digital composition, the key subject point displacement from the principal axis between frames is always maintained as a whole integer number of pixels from the principal axis. The total parallax is the summation of the absolute value of the displacement of the key subject point from the principal axis in the closest frame and the absolute value of the displacement of the key subject point from the principal axis in the furthest frame.

When capturing images herein, applicant refers to depth of field or circle of confusion and circle of comfort is referred to when viewing image on the viewing device.

Documents

Three-Dimensional Display Technology, pages 1-80, by Jason Geng is incorporated by reference herein.

U.S. Pat. Nos. 9,992,473, 10,033,990, and 10,178,247 are incorporated herein by reference in their entirety.

Creating depth perception using motion parallax is known. However, in order to maximize depth while maintaining a pleasing viewing experience, a systematic approach is introduced. The system combines factors of the human visual system with image capture procedures to produce a realistic depth experience on any 2D viewing device.

The technique introduces the Circle of Comfort CoC that prescribe the location of the image capture system relative to the scene S. The Circle of Comfort CoC relative to the Key Subject KS (point of convergence, focal point) sets the optimum near plane and far plane, i.e., controls the parallax of the scene S.

The system was developed so any capture device such as iPhone, camera or video camera can be used to capture the scene. Similarly, the captured images can be combined and viewed on any digital output device such as smart phone, tablet, monitor, TV, laptop, or computer screen.

As will be appreciated by one of skill in the art, the present disclosure may be embodied as a method, data processing system, or computer program product. Accordingly, the present disclosure may take the form of an entirely hardware embodiment, entirely software embodiment or an embodiment combining software and hardware aspects. Furthermore, the present disclosure may take the form of a computer program product on a computer-readable storage medium having computer-readable program code means embodied in the medium. Any suitable computer readable medium may be utilized, including hard disks, ROM, RAM, CD-ROMs, electrical, optical, magnetic storage devices and the like.

The present disclosure is described below with reference to flowchart illustrations of methods, apparatus (systems) and computer program products according to embodiments of the present disclosure. It will be understood that each block or step of the flowchart illustrations, and combinations of blocks or steps in the flowchart illustrations, can be implemented by computer program instructions or operations. These computer program instructions or operations may be loaded onto a general purpose computer, special purpose computer, or other programmable data processing apparatus to produce a machine, such that the instructions or operations, which execute on the computer or other programmable data processing apparatus, create means for implementing the functions specified in the flowchart block or blocks/step or steps.

These computer program instructions or operations may also be stored in a computer-usable memory that can direct a computer or other programmable data processing apparatus to function in a particular manner, such that the instructions or operations stored in the computer-usable memory produce an article of manufacture including instruction means which implement the function specified in the flowchart block or blocks/step or steps. The computer program instructions or operations may also be loaded onto a computer or other programmable data processing apparatus (processor) to cause a series of operational steps to be performed on the computer or other programmable apparatus (processor) to produce a computer implemented process such that the instructions or operations which execute on the computer or other programmable apparatus (processor) provide steps for implementing the functions specified in the flowchart block or blocks/step or steps.

Accordingly, blocks or steps of the flowchart illustrations support combinations of means for performing the specified functions, combinations of steps for performing the specified functions, and program instruction means for performing the specified functions. It should also be understood that each block or step of the flowchart illustrations, and combinations of blocks or steps in the flowchart illustrations, can be implemented by special purpose hardware-based computer systems, which perform the specified functions or steps, or combinations of special purpose hardware and computer instructions or operations.

Computer programming for implementing the present disclosure may be written in various programming languages, database languages, and the like. However, it is understood that other source or object oriented programming languages, and other conventional programming language may be utilized without departing from the spirit and intent of the present disclosure.

Referring now to FIG. 1, there is illustrated a block diagram of a computer system 10 that provides a suitable environment for implementing embodiments of the present disclosure. The computer architecture shown in FIG. 1 is divided into two parts—motherboard 100 and the input/output (I/O) devices 200. Motherboard 100 preferably includes subsystems or processor to execute instructions such as central processing unit (CPU) 102, a memory device, such as random access memory (RAM) 104, input/output (I/O) controller 108, and a memory device such as read-only memory (ROM) 106, also known as firmware, which are interconnected by bus 110. A basic input output system (BIOS) containing the basic routines that help to transfer information between elements within the subsystems of the computer is preferably stored in ROM 106, or operably disposed in RAM 104. Computer system 10 further preferably includes I/O devices 202, such as main storage device 214 for storing operating system 204 and executes as instruction via application program(s) 206, and display 208 for visual output, and other I/O devices 212 as appropriate. Main storage device 214 preferably is connected to CPU 102 through a main storage controller (represented as 108) connected to bus 110. Network adapter 210 allows the computer system to send and receive data through communication devices or any other network adapter capable of transmitting and receiving data over a communications link that is either a wired, optical, or wireless data pathway. It is recognized herein that central processing unit (CPU) 102 performs instructions, operations or commands stored in ROM 106 or RAM 104.

It is contemplated herein that computer system 10 may include smart devices, such as smart phone, iPhone, android phone (Google, Samsung, or other manufactures), tablets, desktops, laptops, digital image capture devices, and other computing devices with two or more digital image capture devices and/or 3D display 208 (smart device).

It is further contemplated herein that display 208 may be configured as a foldable display or multi-foldable display capable of unfolding into a larger display surface area.

Many other devices or subsystems or other I/O devices 212 may be connected in a similar manner, including but not limited to, devices such as microphone, speakers, flash drive, CD-ROM player, DVD player, printer, main storage device 214, such as hard drive, and/or modem each connected via an I/O adapter. Also, although preferred, it is not necessary for all of the devices shown in FIG. 1 to be present to practice the present disclosure, as discussed below. Furthermore, the devices and subsystems may be interconnected in different configurations from that shown in FIG. 1, or may be based on optical or gate arrays, or some combination of these elements that is capable of responding to and executing instructions or operations. The operation of a computer system such as that shown in FIG. 1 is readily known in the art and is not discussed in further detail in this application, so as not to overcomplicate the present discussion.

Figure 2:
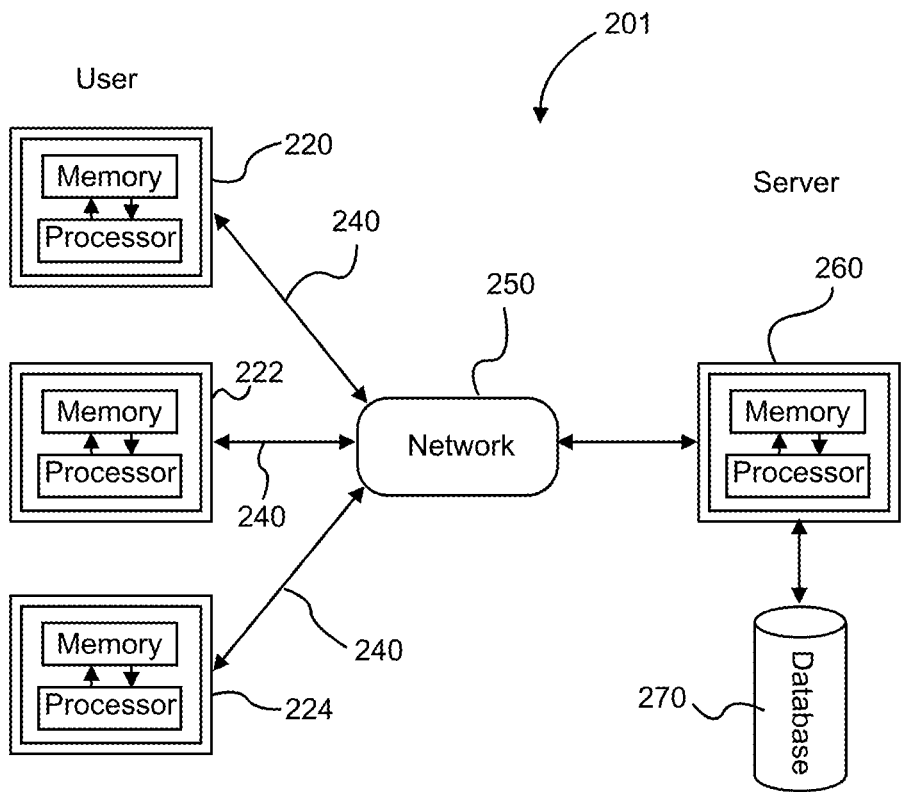
FIG. 2 is a block diagram of a communications system implemented by the computer system in FIG. 1.

Referring now to FIG. 2, there is illustrated a diagram depicting an exemplary communication system 201 in which concepts consistent with the present disclosure may be implemented. Examples of each element within the communication system 201 of FIG. 2 are broadly described above with respect to FIG. 1. In particular, the server system 260 and user system 220 have attributes similar to computer system 10 of FIG. 1 and illustrate one possible implementation of computer system 10. Communication system 201 preferably includes one or more user systems 220, 222, 224 (It is contemplated herein that computer system 10 may include smart devices, such as smart phone, iPhone, android phone (Google, Samsung, or other manufactures), tablets, desktops, laptops, cameras, and other computing devices with display 208 (smart device)), one or more server system 260, and network 250, which could be, for example, the Internet, public network, private network or cloud. User systems 220-224 each preferably includes a computer-readable medium, such as random access memory, coupled to a processor. The processor, CPU 102, executes program instructions or operations stored in memory. Communication system 201 typically includes one or more user system 220. For example, user system 220 may include one or more general-purpose computers (e.g., personal computers), one or more special purpose computers (e.g., devices specifically programmed to communicate with each other and/or the server system 260), a workstation, a server, a device, a digital assistant or a "smart" cellular telephone or pager, a digital camera, a component, other equipment, or some combination of these elements that is capable of responding to and executing instructions or operations.

Similar to user system 220, server system 260 preferably includes a computer-readable medium, such as random access memory, coupled to a processor. The processor executes program instructions stored in memory. Server system 260 may also include a number of additional external or internal devices, such as, without limitation, a mouse, a CD-ROM, a keyboard, a display, a storage device and other attributes similar to computer system 10 of FIG. 1. Server system 260 may additionally include a secondary storage element, such as database 270 for storage of data and information. Server system 260, although depicted as a single computer system, may be implemented as a network of computer processors. Memory in server system 260 contains one or more executable steps, program(s), algorithm(s), or application(s) 206 (shown in FIG. 1). For example, the server system 260 may include a web server, information server, application server, one or more general-purpose computers (e.g., personal computers), one or more special purpose computers (e.g., devices specifically programmed to communicate with each other), a workstation or other equipment, or some combination of these elements that is capable of responding to and executing instructions or operations.

Communications system 201 is capable of delivering and exchanging data (including three dimensional 3D image files) between user system 220 and a server system 260 through communications link 240 and/or network 250. Through user system 220, users can preferably communicate data over network 250 with each other user system 220, 222, 224, and with other systems and devices, such as server system 260, to electronically transmit, store, print and/or view multidimensional digital master image(s) 303 (see FIG. 7). Communications link 240 typically includes network 250 making a direct or indirect communication between the user system 220 and the server system 260, irrespective of physical separation. Examples of a network 250 include the Internet, cloud, analog or digital wired and wireless networks, radio, television, cable, satellite, and/or any other delivery mechanism for carrying and/or transmitting data or other information, such as to electronically transmit, store, print and/or view multidimensional digital master image(s) 303. The communications link 240 may include, for example, a wired, wireless, cable, optical or satellite communication system or other pathway.

Figure 3:
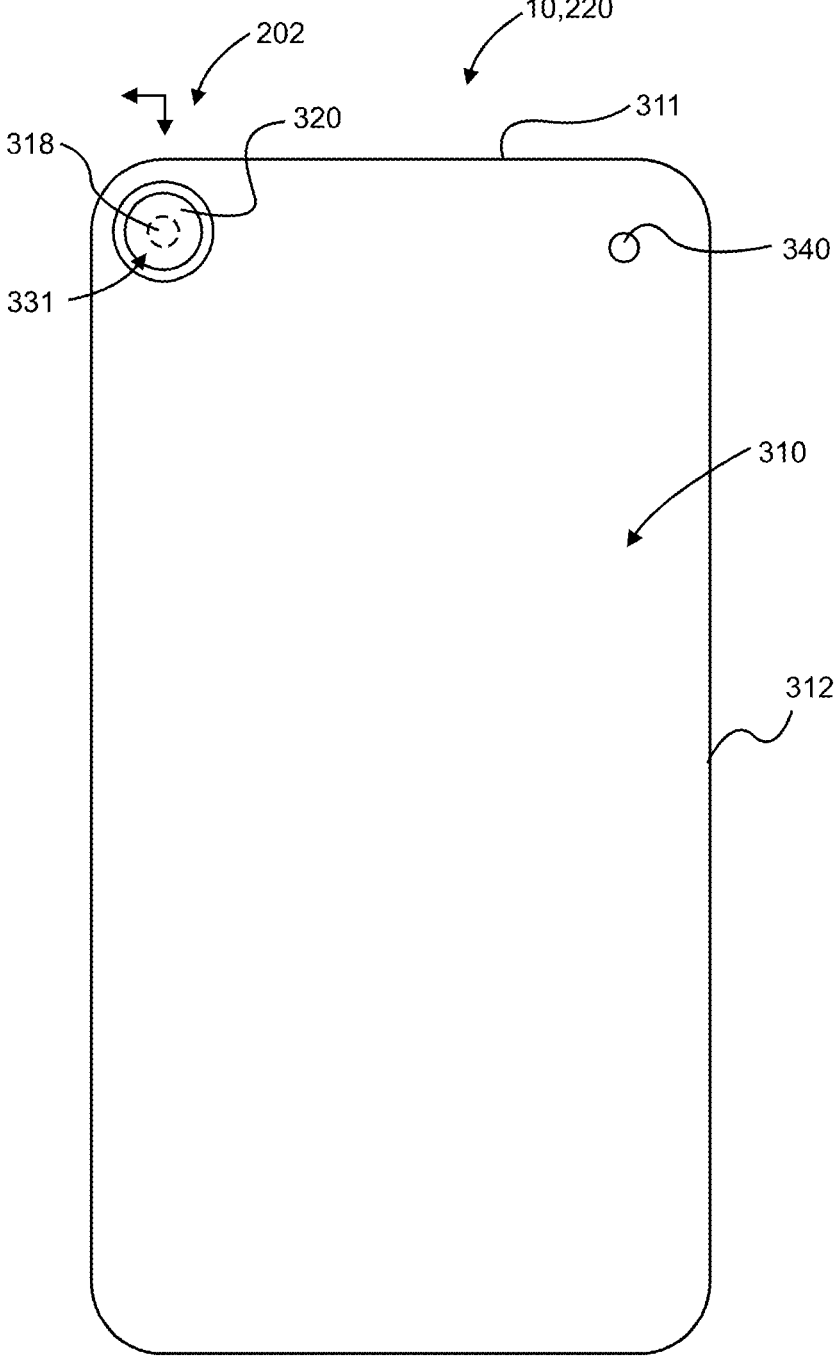
FIG. 3 is a diagram of an exemplary embodiment of a computing device with a single image capture device according to select embodiments of the disclosure.

Referring now to FIG. 3, by way of example, and not limitation, there is illustrated a computer system 10, such as smart device or portable smart device having back side 310, a first edge, such as short edge 311 and a second edge, such as long edge 312. Back side 310 may include I/O devices 202, such as an exemplary embodiment of image capture module 330 and one or more sensors 340 to measure distance between computer system 10 and selected depths in an image or scene (depth). Image capture module 330 may include digital image capture device 331. It is contemplated herein that other sensor components to generate image signals for the captured image of scene S and other data processing module 324 to process or manipulate the image data may be utilized herein to generate second 2D image from first 2D image captured by digital image capture device 331. Second 2D image generated by data processing module 324 or central processing unit (CPU) 102 may be substantially similar to a 2D image that could have been captured by digital image capture device 332, 333, 334 (positioned vertically or horizontally, in series linearly within an intraocular or interpupillary distance width IPD (distance between pupils of human visual system within a Circle of Comfort relationship to optimize digital multi-dimensional images for the human visual system) as to back side 310 or proximate and parallel thereto long edge 312. Interpupillary distance width IPD is preferably the distance between an average human's pupils may have a distance between approximately two and a half inches, 2.5 inches (6.35 cm), more preferably between approximately 40-80 mm, the vast majority of adults have IPDs in the range 50-75 mm, the wider range of 45-80 mm is likely to include (almost) all adults, and the minimum IPD for children (down to five years old) is around 40 mm). It is contemplated herein that image capture module 330 and one or more sensors 340 may be configured as combinations of image capture device 330 and sensor 340 configured as an integrated unit or module where sensor 340 controls or sets the depth of image capture device 330, whether different depths in scene S, such as foreground, and person P or object, background, such as closest point CP, key subject point KS, and a furthest point FP, shown in FIG. 7. For reference herein plurality of image capture devices, may include first image capture device 331 centered proximate first end IPD IPD.1 of interpupillary distance width IPD, fourth four image capture device 334 centered proximate second end IPD.2 of interpupillary distance width IPD, and remaining image capture devices second image capture device 332 and third four image capture device 333 evenly spaced therebetween first end IPD IPD.1 and second end IPD.2 of interpupillary distance width IPD.

It is contemplated herein that smart device or portable smart device with a display may be configured as rectangular or square or other like configurations providing a surface area having first edge 311 and second edge 312.

It is contemplated herein that image capture device 331 or image capture module 330 may be surrounded by recessed, stepped, or beveled edge 314, image capture devices 331 may be encircled by recessed, stepped, or beveled ring 316, and image capture device 331 or image capture module 330 may be covered by lens cover 320 with a lens thereunder lens 318.

It is contemplated herein that image capture device 331 may be individual capture devices and not part of image capture module.

It is further contemplated herein that image capture device 331 may be positioned anywhere on back side 310 or front side 313.

With respect to computer system 10 and image capture device 330, it is to be realized that the optimum dimensional relationships, to include variations in size, materials, shape, form, position, connection, function and manner of operation, assembly and use, are intended to be encompassed by the present disclosure.

Back side 310 may include I/O devices 202, such as an exemplary embodiment of image capture module 330 and one or more sensors 340 to measure distance between computer system 10 and selected depths in an image or scene (depth). It is contemplated herein that when sensor 340 is not utilized to calculate different depths in scene S (distance from or image capture devices 331-334 to foreground, background, and person P or object, such as closest point CP, key subject point KS, and furthest point FP) then a user may be prompted to capture the scene S images a set distance from image capture devices 331-334 to key subject point KS in a scene S, including but not limited to six feet (6 ft.) distance from closest point CP or key subject KS point.

It is contemplated herein that other sensor components to generate image signals for the captured image of scene S and other data processing module 324 to process or manipulate the image data may be utilized herein.

It is contemplated herein that image capture module 330 and/or digital or image capture device 331 is used to obtain the 2D digital view and generate a substantially similar 2D digital view of FIGS. 13 and 14 and FIGS. 9-12 of scene S. Moreover, it is further contemplated herein that image capture module 330 may include an image capture device other than the number set forth herein.

It is further contemplated herein that image capture module 330 and digital or image capture device 331 positioned linearly within the intraocular or interpupillary distance width IPD enables accurate scene S reproduction therein display 208 to produce a multidimensional digital image on display 208.

Figure 3B:
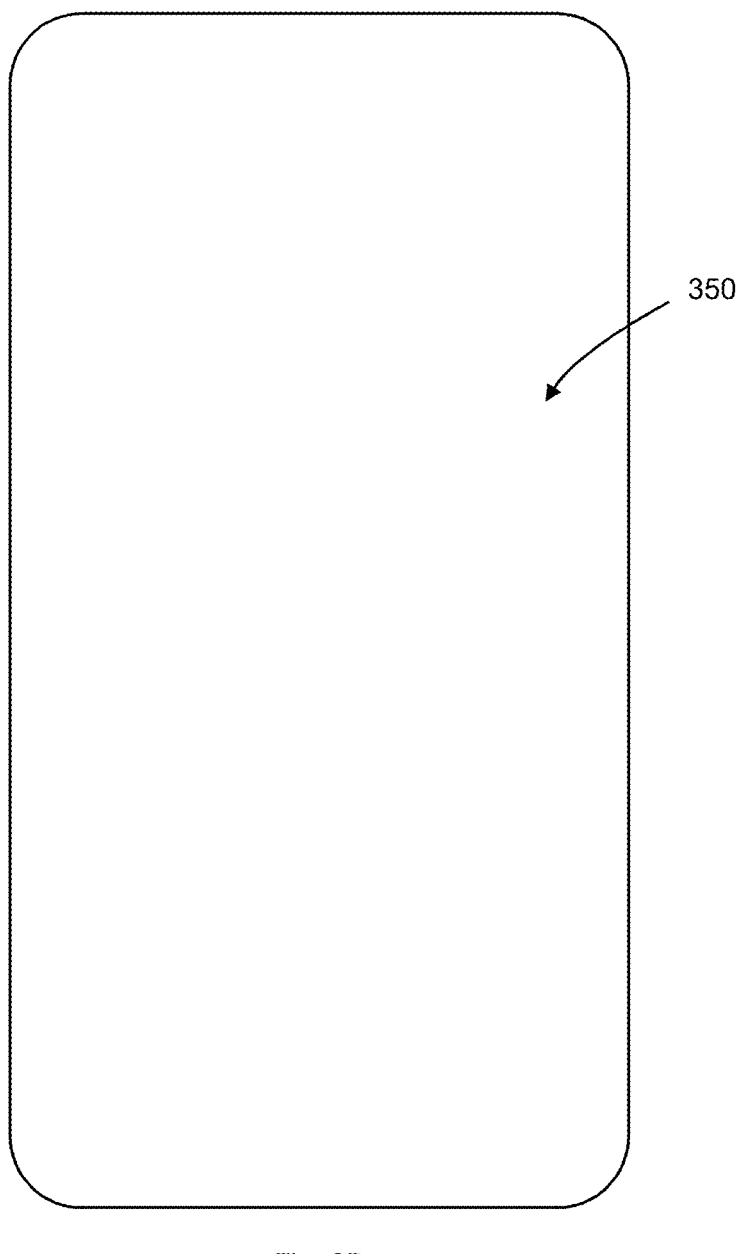
FIG. 3B is a diagram of an exemplary embodiment of a screen filter configured to lay over the display of the computing device in FIG. 3.

Referring now to FIG. 3B, by way of example, and not limitation, there is illustrated thin film overlay 350 configured to overlay on display 208 computer system 10. Thin film overlay 350 may include any of the features of FIGS. 5, including but not limited to lens array, such as lenticular lens 514, panel stack of components 520, lenticular lens 540, being parabolic or dome shaped segment or section 540A (parabolic lens or dome lens) of lenticular lens 514, or thin film overlay 350 may include other techniques to bend or refract light, such as barrier screen, lenticular, parabolic, overlays, waveguides, black line and the like capable of separating multidimensional digital image on display 208 into a left and right image for viewing of multidimensional digital image on display 208.

Figure 4:
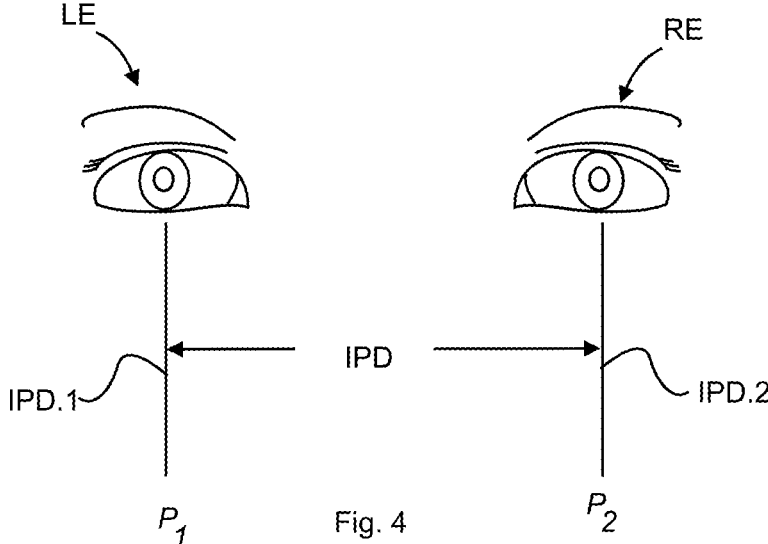
FIG. 4 is a diagram of an exemplary embodiment of human eye spacing the intraocular or interpupillary distance width, the distance between an average human's pupils.

Referring now to FIG. 4, by way of example, and not limitation, there is illustrated a front facial view of a human with left eye LE and right eye RE and each having a midpoint of a pupil P1, P2 to illustrate the human eye spacing or the intraocular or interpupillary distance IPD width, the distance between an average human's visual system pupils. Interpupillary distance (IPD) is the distance measured in millimeters/inches between the centers of the pupils of the eyes. This measurement is different from person to person and, also depends on whether they are looking at near objects or far away. P1 may be represented by first end IPD.1 of interpupillary distance width IPD and PS may be represented by second end IPD.2 of interpupillary distance width IPD.

Figure 5A:
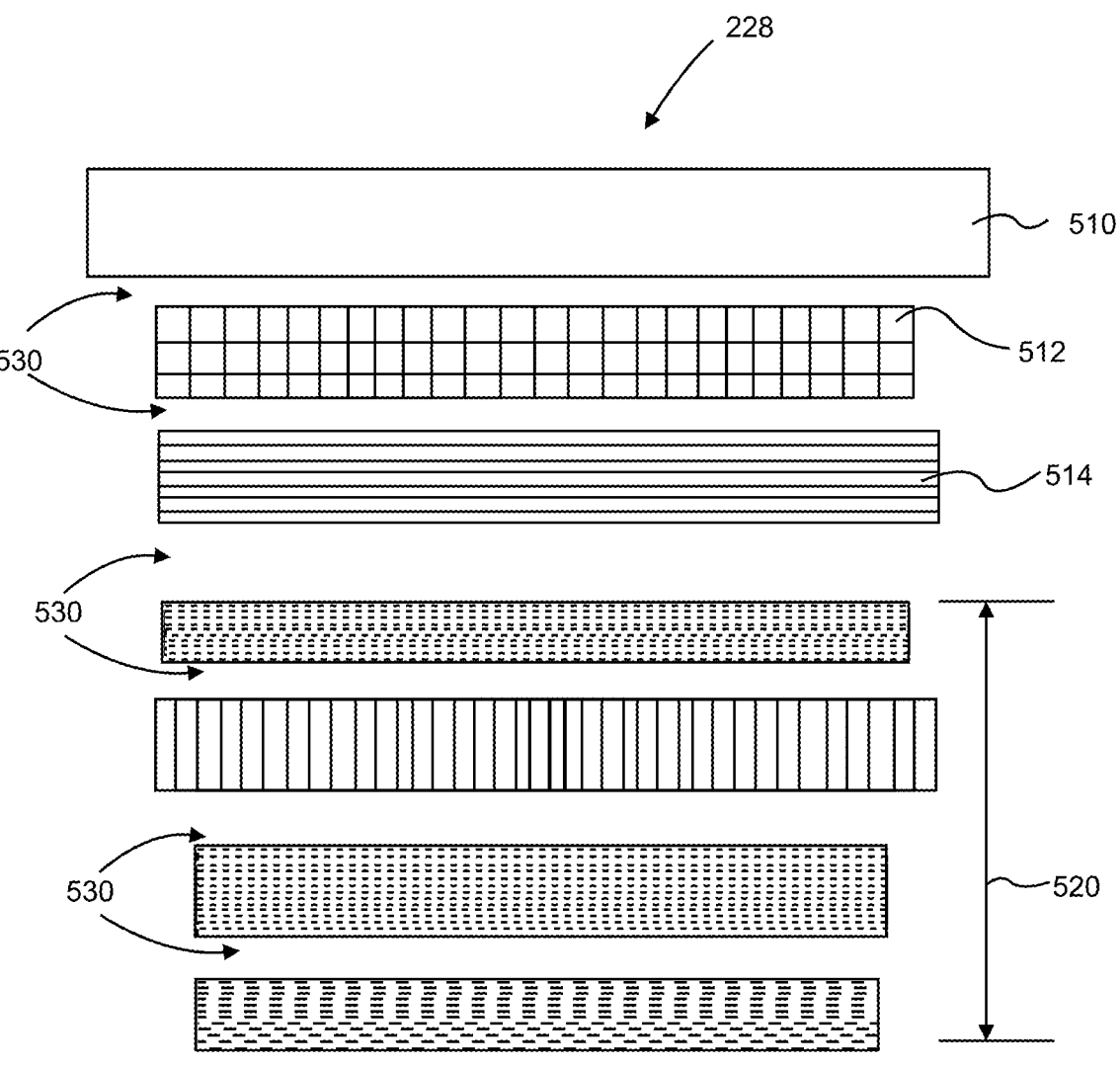
FIG. 5A is a cross-section diagram of an exemplary embodiment of a display stack according to select embodiments of the instant disclosure.

Referring now to FIG. 5A, there is illustrated by way of example, and not limitation a cross-sectional view of an exemplary stack up of components of display 208. Display 208 may include an array of or plurality of pixels emitting light, such as LCD panel stack of components 520 having electrodes, such as front electrodes and back electrodes, polarizers, such as horizontal polarizer and vertical polarizer, diffusers, such as gray diffuser, white diffuser, and backlight to emit red R, green G, and blue B light. Moreover, display 208 may include other standard LCD user U interaction components, such as top glass cover 510 with capacitive touch screen glass 512 positioned between top glass cover 510 and LCD panel stack components 520. It is contemplated herein that other forms of display 208 may be included herein other than LCD, such LED, ELED, PDP, QLED, and other types of display technologies. Furthermore, display 208 may include a lens array, such as lenticular lens 514 preferably positioned between capacitive touch screen glass 512 and LCD panel stack of components 520, and configured to bend or refract light in a manner capable of displaying an interlaced stereo pair of left and right images as a 3d or multidimensional digital image(s) 1010 on display 208 and, thereby displaying a multidimensional digital image of scene S on display 208. Transparent adhesives 530 may be utilized to bond elements in the stack, whether used as a horizontal adhesive or a vertical adhesive to hold multiple elements in the stack. For example, to produce a 3D view or produce a multidimensional digital image on display 208, a 1920×1200 pixel image via a plurality of pixels needs to be divided in half, 960×1200, and either half of the plurality of pixels may be utilized for a left image and right image.

It is contemplated herein that lens array may include other techniques to bend or refract light, such as barrier screen, lenticular, parabolic, overlays, waveguides, black line and the like capable of separating into a left and right image.

It is further contemplated herein that lenticular lens 514 may be orientated in vertical columns when display 208 is held in a landscape view to produce a multidimensional digital image on display 208. However, when display 208 is held in a portrait view the 3D effect is unnoticeable enabling 2D and 3D viewing with the same display 208.

It is still further contemplated herein that smoothing, or other image noise reduction techniques, and foreground subject focus may be used to soften and enhance the 3D view or multidimensional digital image on display 208.

Figure 5B:
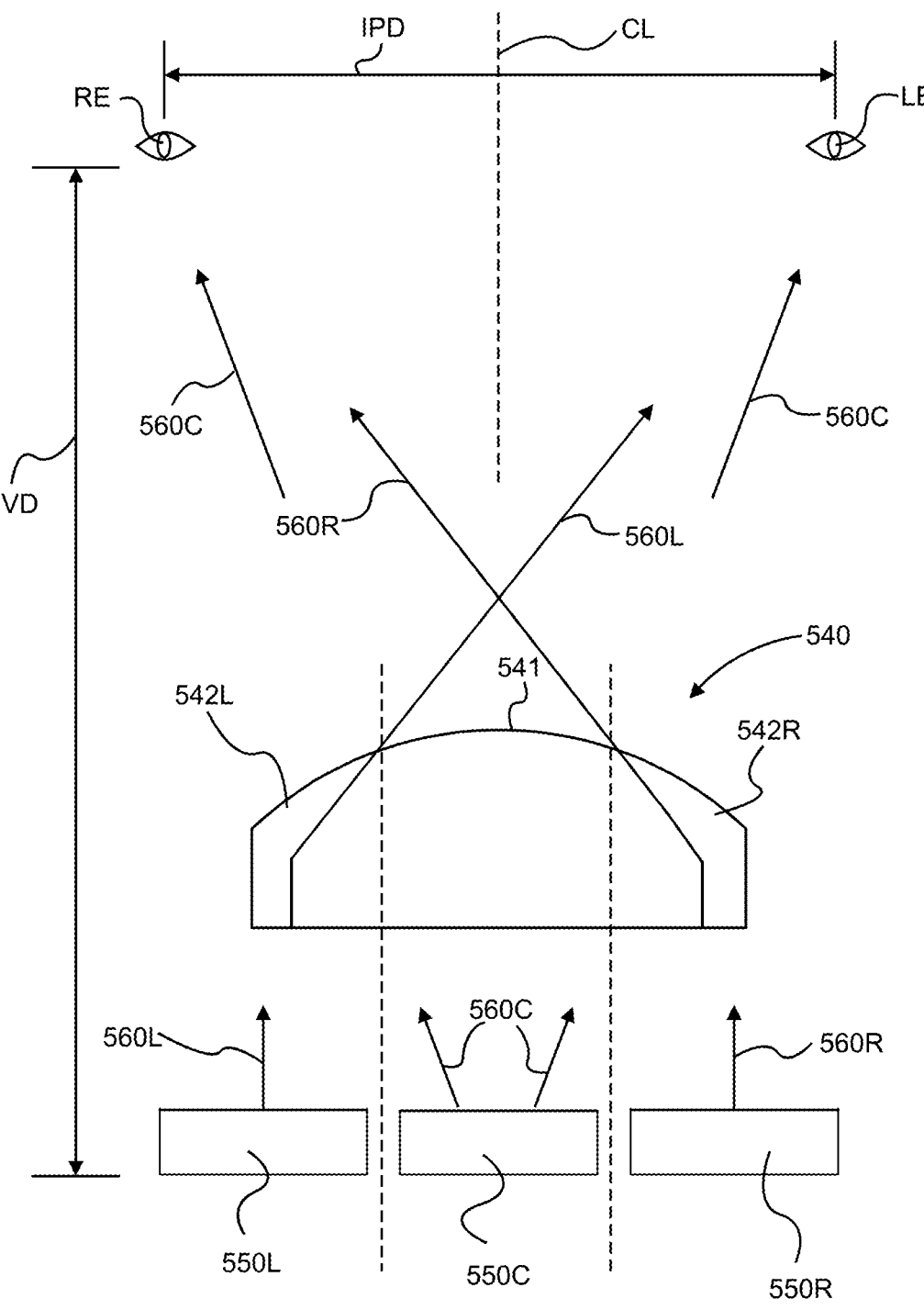

Referring now to FIG. 5B, there is illustrated by way of example, and not limitation a representative segment or section of one embodiment of exemplary refractive element, such as lenticular lens 514 of display 208. Each sub-element of lenticular lens 514 being arced or curved or arched segment or section 540 of lenticular lens 514 may be configured having a repeating series of trapezoidal lens sections, segments, or plurality of sub-elements or refractive elements. For example, each arced or curved or arched segment 540 may be configured having lens peak 541 of lenticular lens 540 and dimensioned to be one pixel 550 (emitting red R, green G, and blue B light) wide such as having assigned center pixel 550C thereto lens peak 541. It is contemplated herein that center pixel 550C light passes through lenticular lens 540 as center light 560C to provide 2D viewing of image on display 208 to left eye LE and right eye RE a viewing distance VD from pixel 550 or trapezoidal segment or section 540 of lenticular lens 514. Moreover, each arced or curved segment 540 may be configured having angled sections, such as lens angle A1 of lens refractive element, such as lens sub-element 542 (plurality of sub-elements) of lenticular lens 540 and dimensioned to be one pixel wide, such as having left pixel 550L and right pixel 550R assigned thereto left lens, left lens sub-element 542L having angle A1, and right lens sub-element 542R having angle A1, for example an incline angle and a decline angle respectively to refract light across center line CL. It is contemplated herein that pixel 550L/R light passes through lenticular lens 540 and bends or refracts to provide left and right images to enable 3D viewing of image on display 208; via left pixel 550L light passes through left lens angle 542L and bends or refracts, such as light entering left lens angle 542L bends or refracts to cross center line CL to the right R side, left image light 560L toward left eye LE and right pixel 550R light passes through right lens angle 542R and bends or refracts, such as light entering right lens angle 542R bends or refracts to cross center line CL to the left side L, right image light 560R toward right eye RE, to produce a multidimensional digital image on display 208.

Figure 6:
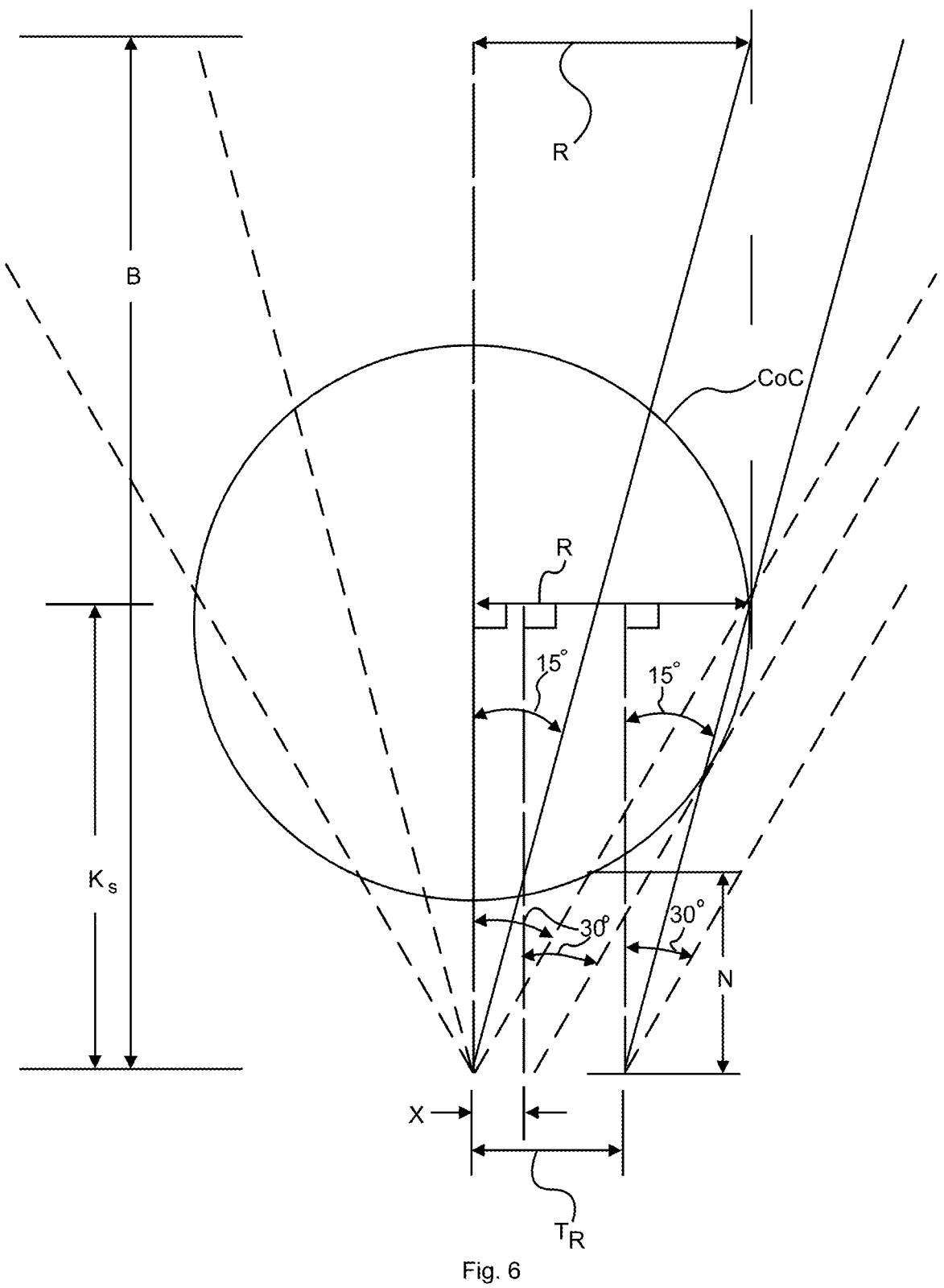
FIG. 6 is a top view illustration identifying planes of a scene and a circle of comfort in scale with right triangles defining positioning of capture devices on lens plane.

It is contemplated herein that left and right images may be produce as set forth in FIGS. 6.1-6.3 from U.S. Pat. Nos. 9,992,473, 10,033,990, and 10,178,247 and electrically communicated to left pixel 550L and right pixel 550R. Moreover, 2D image may be electrically communicated to center pixel 550C.

In this FIG. each lens peak 541 has a corresponding left and right angled lens 542, such as left angled lens 542L and right angled lens 542R on either side of lens peak 541 and each assigned one pixel, center pixel 550C, left pixel 550L and right pixel 550R, assigned respectively thereto.

In this FIG., the viewing angle A1 is a function of viewing distance VD, size S of display 208, wherein A1=2 arctan (S/2VD)

In one embodiment, each pixel may be configured from a set of sub-pixels. For example, to produce a multidimensional digital image on display 208 each pixel may be configured as one or two 3×3 sub-pixels of LCD panel stack components 520 emitting one or two red R light, one or two green G light, and one or two blue B light therethrough segments or sections of lenticular lens 540 to produce a multidimensional digital image on display 208. Red R light, green G light, and blue B may be configured as vertical stacks of three horizontal sub-pixels.

It is recognized herein that trapezoid shaped lens 540 bends or refracts light uniformly through its center C, left L side, and right R side, such as left angled lens 542L and right angled lens 542R, and lens peak 541.

Figure 5C:
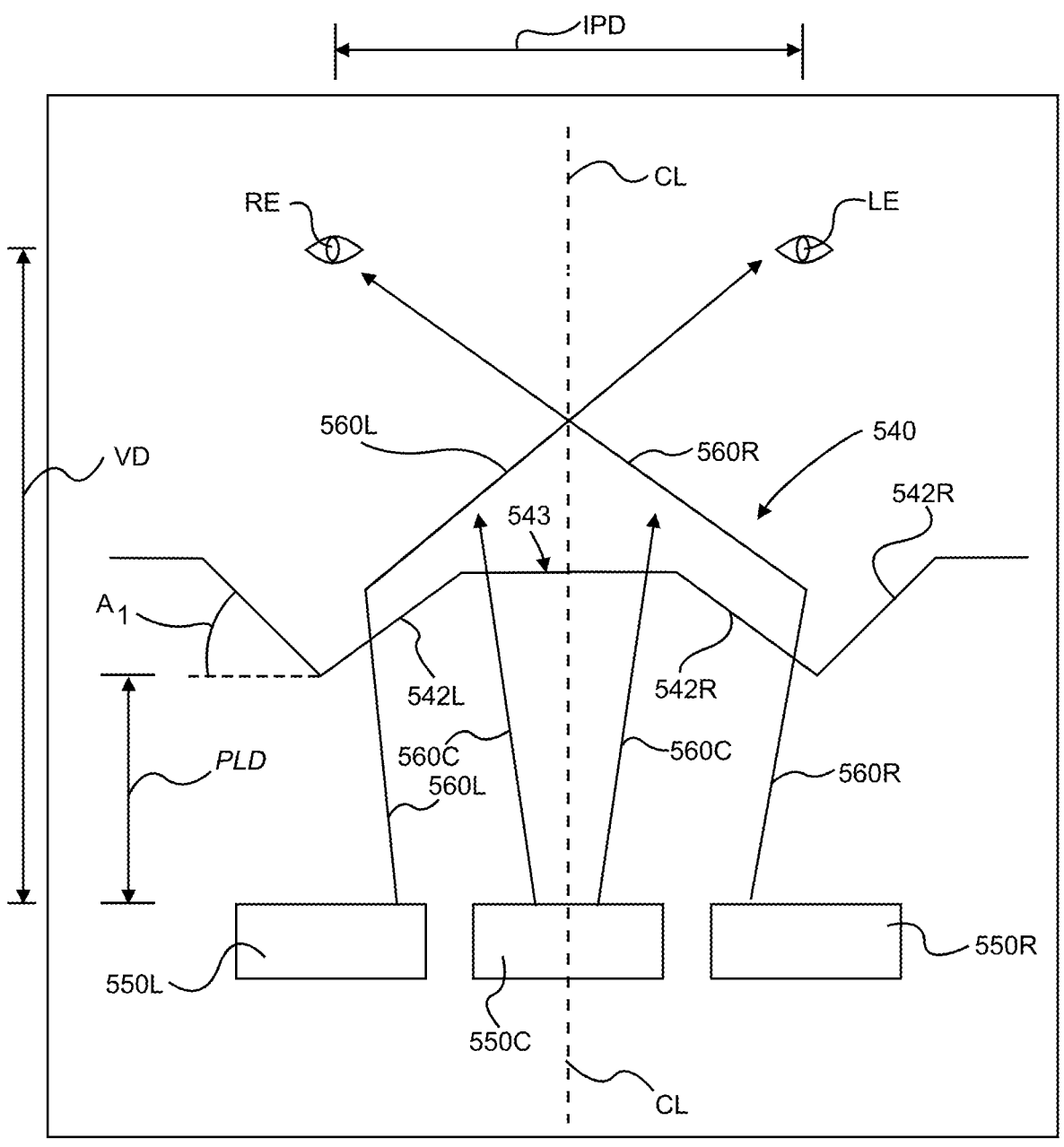

Referring now to FIG. 5C, there is illustrated by way of example, and not limitation a prototype segment or section of one embodiment of exemplary lenticular lens 514 of display 208. Each segment or plurality of sub-elements or refractive elements being trapezoidal shaped segment or section 540 of lenticular lens 514 may be configured having a repeating series of trapezoidal lens segments. For example, each trapezoidal segment 540 may be configured having lens peak 541 of lenticular lens 540 and dimensioned to be one or two pixel 550 wide and flat or straight lens, such as lens valley 543 and dimensioned to be one or two pixel 550 wide (emitting red R, green G, and blue B light). For example, lens valley 543 may be assigned center pixel 550C. It is contemplated herein that center pixel 550C light passes through lenticular lens 540 as center light 560C to provide 2D viewing of image on display 208 to left eye LE and right eye RE a viewing distance VD from pixel 550 or trapezoidal segment or section 540 of lenticular lens 514. Moreover, each trapezoidal segment 540 may be configured having angled sections, such as lens angle 542 of lenticular lens 540 and dimensioned to be one or two pixel wide, such as having left pixel 550L and right pixel 550R assigned thereto left lens angle 542L and right lens angle 542R, respectively. It is contemplated herein that pixel 550L/R light passes through lenticular lens 540 and bends to provide left and right images to enable 3D viewing of image on display 208; via left pixel 550L light passes through left lens angle 542L and bends or refracts, such as light entering left lens angle 542L bends or refracts to cross center line CL to the right R side, left image light 560L toward left eye LE; and right pixel 550R light passes through right lens angle 542R and bends or refracts, such as light entering right lens angle 542R bends or refracts to cross center line CL to the left side L, right image light 560R toward right eye RE to produce a multidimensional digital image on display 208.

It is contemplated herein that angle A1 of lens angle 542 is a function of the pixel 550 size, stack up of components of display 208, refractive properties of lenticular lens 514, and distance left eye LE and right eye RE are from pixel 550, viewing distance VD.

In this FIG., the viewing angle A1 is a function of viewing distance VD, size S of display 208, wherein A1=2 arctan (S/2VD).

Figure 5D:
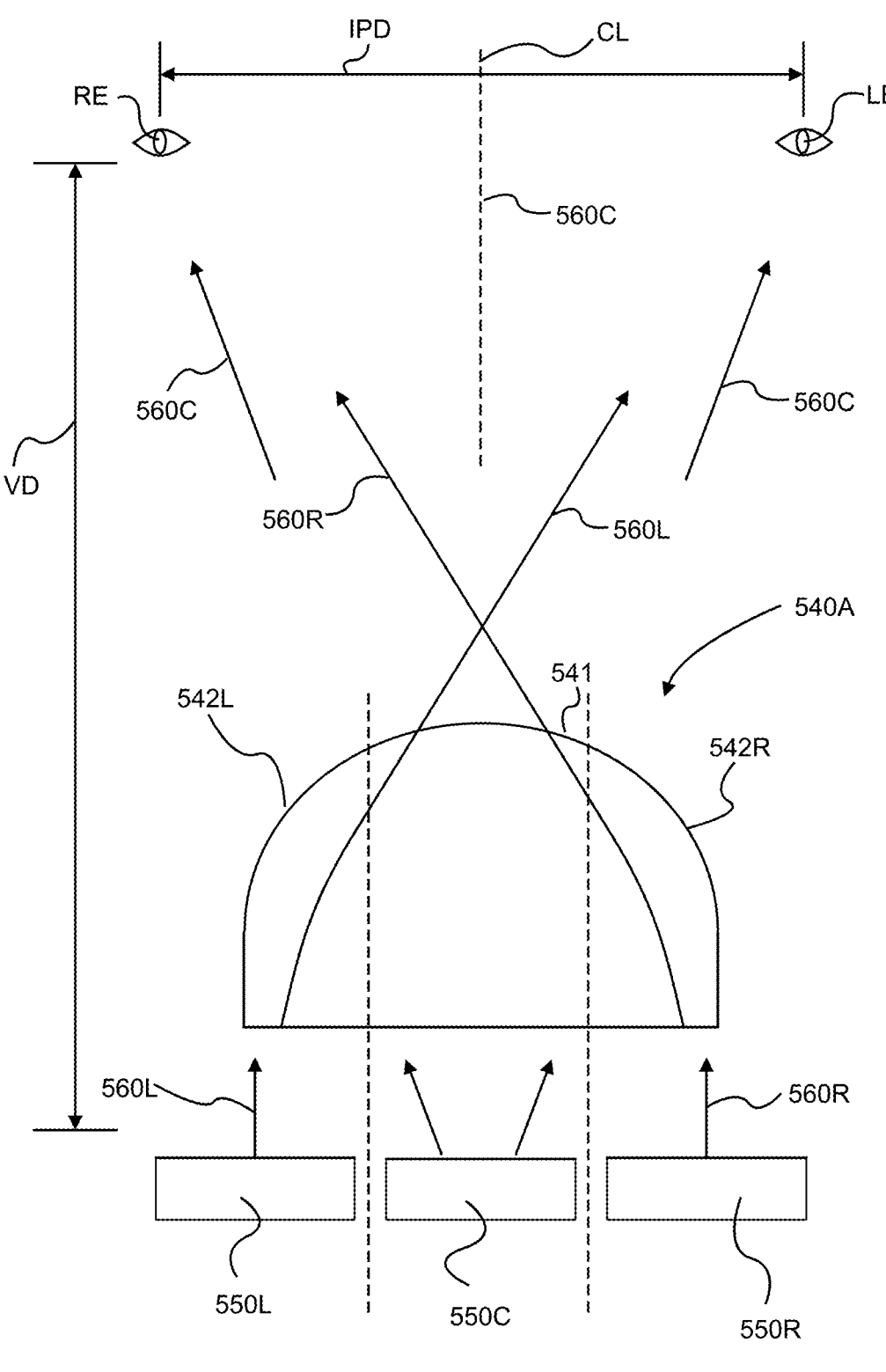

Referring now to FIG. 5D, there is illustrated by way of example, and not limitation a representative segment or section of one embodiment of exemplary lenticular lens 514 of display 208. Each segment or plurality of sub-elements or refractive elements being parabolic or dome shaped segment or section 540A (parabolic lens or dome lens) of lenticular lens 514 may be configured having a repeating series of dome shaped, curved, semi-circular lens segments. For example, each dome segment 540A may be configured having lens peak 541 of lenticular lens 540 and dimensioned to be one or two pixel 550 wide (emitting red R, green G, and blue B light) such as having assigned center pixel 550C thereto lens peak 541. It is contemplated herein that center pixel 550C light passes through lenticular lens 540 as center light 560C to provide 2D viewing of image on display 208 to left eye LE and right eye RE a viewing distance VD from pixel 550 or trapezoidal segment or section 540 of lenticular lens 514. Moreover, each trapezoidal segment 540 may be configured having angled sections, such as lens angle 542 of lenticular lens 540 and dimensioned to be one pixel wide, such as having left pixel 550L and right pixel 550R assigned thereto left lens angle 542L and right lens angle 542R, respectively. It is contemplated herein that pixel 550L/R light passes through lenticular lens 540 and bends to provide left and right images to enable 3D viewing of image on display 208; via left pixel 550L light passes through left lens angle 542L and bends or refracts, such as light entering left lens angle 542L bends or refracts to cross center line CL to the right R side, left image light 560L toward left eye LE and right pixel 550R light passes through right lens angle 542R and bends or refracts, such as light entering right lens angle 542R bends or refracts to cross center line CL to the left side L, right image light 560R toward right eye RE to produce a multidimensional digital image on display 208.

It is recognized herein that dome shaped lens 4214B bends or refracts light almost uniformly through its center C, left L side, and right R side.

It is recognized herein that representative segment or section of one embodiment of exemplary lenticular lens 514 may be configured in a variety of other shapes and dimensions.

Moreover, to achieve highest quality two dimensional (2D) image viewing and multidimensional digital image viewing on the same display 208 simultaneously, a digital form of alternating black line or parallax barrier (alternating) may be utilized during multidimensional digital image viewing on display 208 without the addition of lenticular lens 514 to the stackup of display 208 and then digital form of digital form of alternating black line or parallax barrier (alternating) may be disabled during two dimensional (2D) image viewing on display 208.

A parallax barrier is a device placed in front of an image source, such as a liquid crystal display, to allow it to show a stereoscopic or multiscopic image without the need for the viewer to wear 3D glasses. Placed in front of the normal LCD, it consists of an opaque layer with a series of precisely spaced slits, allowing each eye to see a different set of pixels, so creating a sense of depth through parallax. A digital parallax barrier is a series of alternating black lines in front of an image source, such as a liquid crystal display (pixels), to allow it to show a stereoscopic or multiscopic image. In addition, face-tracking software functionality may be utilized to adjust the relative positions of the pixels and barrier slits according to the location of the user's eyes, allowing the user to experience the 3D from a wide range of positions. The book Design and Implementation of Autostereoscopic Displays by Keehoon Hong, Soon-gi Park, Jisoo Hong, Byoungho Lee incorporated herein by reference.

It is contemplated herein that parallax and key subject KS reference point calculations may be formulated for the digital or image capture devices 331-334 (n devices) spacing, display 208 distance from user U, lenticular lens 514 configuration (lens angle A1, 542, lens per millimeter and millimeter depth of the array), lens angle 542 as a function of the stack up of components of display 208, refractive properties of lenticular lens 514, and distance left eye LE and right eye RE are from pixel 550, viewing distance VD, distance between capture devices image capture devices 331-332, image capture devices 331-333, or image capture devices 331-334 (interpupillary distance IPD), see FIG. 6 below, and the like to produce digital multi-dimensional images as related to the viewing devices or other viewing functionality, such as barrier screen, lenticular, parabolic, overlays, waveguides, black line and the like with an integrated LCD layer in an LED or OLED, LCD, OLED, and combinations thereof or other viewing devices.

Incorporated herein by reference is paper entitled Three-Dimensional Display Technology, pages 1-80, by Jason Geng of other display techniques that may be utilized to produce display 208, incorporated herein by reference.

It is contemplated herein that number of lenses per mm or inch of lenticular lens 514 is determined by the pixels per inch of display 208.

It is contemplated herein that other angles A1 are contemplated herein, distance of pixels 550C, 550L, 550R from of lens 540 (approximately 0.5 mm), and user U viewing distance from smart device display 208 from user's eyes (approximately fifteen (15) inches), and average human interpupillary spacing between eyes (approximately 2.5 inches) may be factored or calculated to produce digital multi-dimensional images. Governing rules of angles and spacing assure the viewed images thereon display 208 is within the comfort zone of the viewing device to produce digital multi-dimensional images, see FIGS. 5, 6, 11 below.

It is recognized herein that angle A1 of lens 541 may be calculated and set based on viewing distance VD between user U eyes, left eye LE and right eye RE, and pixels 550, such as pixels 550C, 550L, 550R, a comfortable distance to hold display 208 from user's U eyes, such as ten (10) inches to arm/wrist length, or more preferably between approximately fifteen (15) inches to twenty-four (24) inches, and most preferably at approximately fifteen (15) inches.

In use, the user U moves the display 208 toward and away from user's eyes until the digital multi-dimensional images appear to user, this movement factor in user's U actual interpupillary distance IPD spacing and to match user's visual system (near sited and far sited discrepancies) as a function of width position of interlaced left and right images from two image capture devices 331-332, image capture devices 331-333, or image capture devices 331-334 (interpupillary distance IPD), distance between image capture devices, key subject KS depth therein each of digital images (n) of scene S (key subject KS algorithm), horizontal image translation algorithm of two images (left and right image) about key subject KS, interphasing algorithm of two images (left and right image) about key subject KS, angles A1, distance of pixels 550 from of lens 540 (pixel-lens distance (PLD) approximately 0.5 mm)) and refractive properties of lens array, such as trapezoid shaped lens 540 all factored in to produce digital multi-dimensional images for user U viewing display 208. First known elements are number of pixels 550 and number of 2D images two, one captured by image capture device 331 and second 2D image generated therefrom the first 2D image captured by image capture device 331, and such second 2D image is substantially similar to a possible second 2D image that could have been captured by simulated image capture devices 332-334 (interpupillary distance IPD). Images captured at or near interpupillary distance IPD matches the human visual system, simplifies the math, minimizes cross talk between the two images, fuzziness, image movement to produce digital multi-dimensional image viewable on display 208.

It is further contemplated herein that trapezoid shaped lens 540 may be formed from polystyrene, polycarbonate or other transparent materials or similar materials, as these material offers a variety of forms and shapes, may be manufactured into different shapes and sizes, and provide strength with reduced weight; however, other suitable materials or the like, can be utilized, provided such material has transparency and is machinable or formable as would meet the purpose described herein to produce a left and right stereo image and specified index of refraction. It is further contemplated herein that trapezoid shaped lens 541 may be configured with 4.5 lenticular lens per millimeter and approximately 0.33 mm depth.

Referring now to FIG. 6, there is illustrated by way of example, and not limitation a representative illustration of Circle of Comfort CoC in scale with FIGS. 4.1 and 3.1. For the defined plane, the image captured on the lens plane will be comfortable and compatible with human visual system of user U viewing the final image displayed on display 208 if a substantial portion of the image(s) is captured within the Circle of Comfort CoC. Any object, such as near plane N, key subject KS plane, and far plane B captured by image capture device 331, and then second simulated image capture devices 332-334 (interpupillary distance IPD) within the Circle of Comfort CoC will be in focus to the viewer when reproduced as interlaced left and right images, such as image capture device 331, and then second simulated image capture devices 332-334 (interpupillary distance IPD) on display 208. The back-object plane or far plane B is defined as the distance to the intersection of the 15 degree radial line to the perpendicular in the field of view to the 30 degree line or R the radius of the Circle of Comfort CoC. Moreover, defining the Circle of Comfort CoC as the circle formed by passing the diameter of the circle along the perpendicular to Key Subject KS plane with a width determined by the 30 degree radials from the center point on the lens plane, image capture module 330.

Linear positioning or spacing of image capture device 331, and simulated image capture devices 332-334 (inter-pupillary distance IPD) on lens plane within the 30 degree line just tangent to the Circle of Comfort CoC may be utilized to create motion parallax between the two images when viewing an interlaced left and right image, such as image capture devices 331, and second simulated image capture devices 332-334 (interpupillary distance IPD) on display 208 will be comfortable and compatible with human visual system of user U viewing the final image displayed on display 208.

Referring now to FIGS. 6A, 6B, 6C, and 9, there is illustrated by way of example, and not limitation right triangles derived from FIG. 6. All the definitions are based on holding right triangles within the relationship of the scene to image capture. Thus, knowing the key subject KS distance (key subject convergence point) we can calculate the following parameters.

Figures 6A, 6B, 6C:
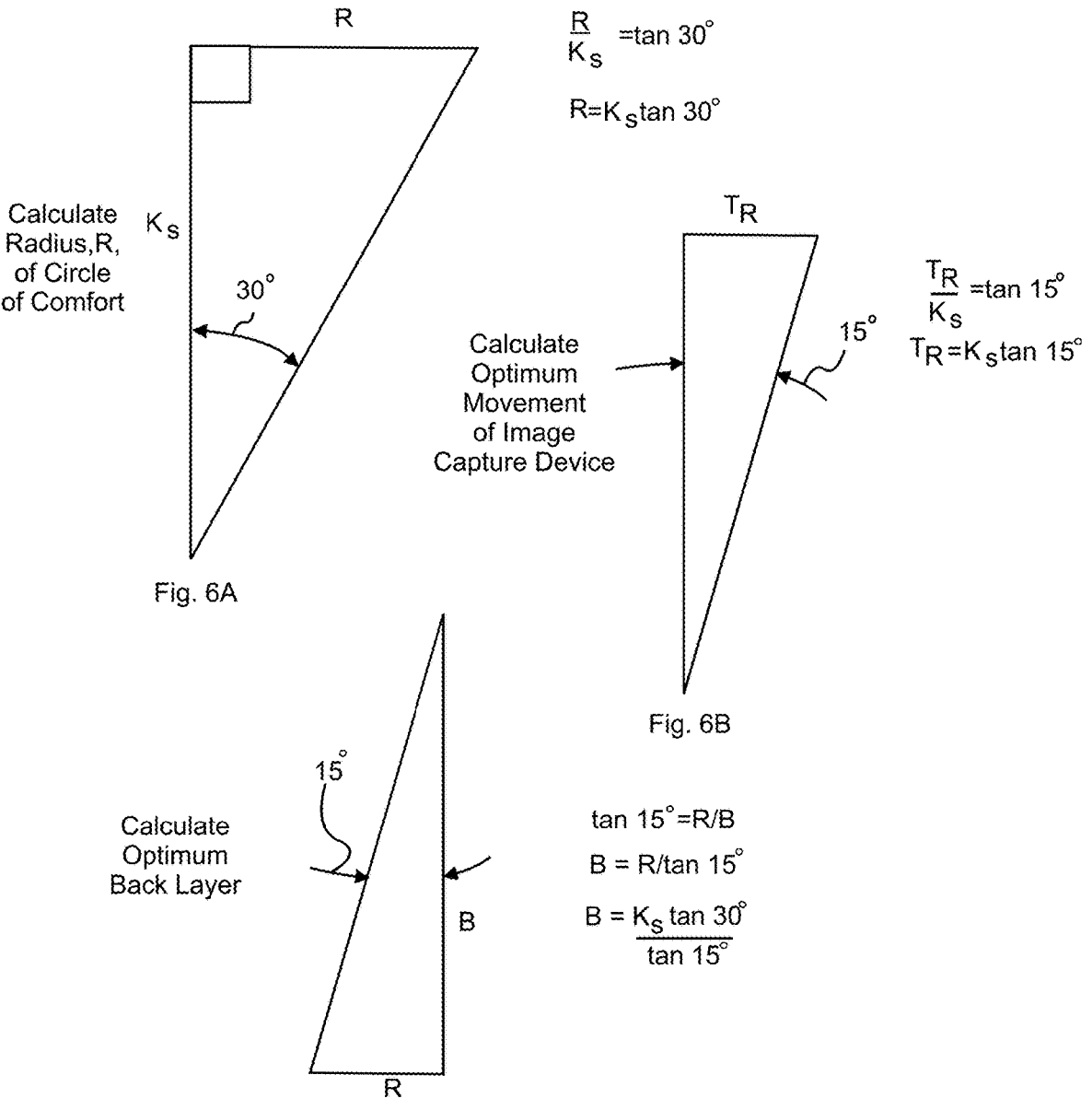
FIG. 6A is a top view illustration of an exemplary embodiment identifying right triangles to calculate the radius of the Circle of Comfort of FIG. 6.
FIG. 6B is a top view illustration of an exemplary embodiment identifying right triangles to calculate linear positioning of capture devices on lens plane of FIG. 6.
FIG. 6C is a top view illustration of an exemplary embodiment identifying right triangles to calculate the optimum distance of backplane of FIG. 6.

FIG. 6A to calculate the radius R of Comfort CoC.

$$R/KS = \tan 30 \text{ degree}$$

$$R = KS * \tan 30 \text{ degree}$$

FIG. 6B to calculate the optimum distance between image capture devices 331-332, image capture devices 331-333, or image capture devices 331-334 (interpupillary distance IPD).

$$TR/KS = \tan 15 \text{ degree}$$

$$TR = KS * \tan 15 \text{ degree; and IPD is } 2 * TR$$

FIG. 6C calculate the optimum far plane $$\tan 15 \text{ degree} = R/B$$

$$B = (KS * \tan 30 \text{ degree})/\tan 15 \text{ degree}$$

Ratio of near plane to far plane=$((KS/(KS \ 8 \tan 30 \text{ degree}))* \tan 15 \text{ degree}$ In order to understand the meaning of TR, point on the linear image capture line of the lends plane that the 15 degree line hits/touches the Comfort CoC. The images are arranged so the key subject KS point is the same in all images captured via two image from capture devices capture devices image capture devices 331-332, image capture devices 331-333, or image capture devices 331-334 (inter-pupillary distance IPD). See FIGS. 6.1-6.3 of U.S. Pat. No. 10,033,990.

A user of image capture devices composes the scene S and moves the image capture devices 330 in our case so the circle of confusion conveys the scene S. Since image capture devices 330 are using multi cameras linearly spaced there is a binocular disparity between the two images captured by linear offset of the image capture devices 330. This disparity can be change by changing image capture devices 330 settings or moving the key subject KS back or away from image capture devices to lessen the disparity or moving the key subject KS closer to image capture devices to increase the disparity. Our system is a fixed image capture devices system and as a guideline, experimentally developed, the near plane should be no closer than approximately six feet from image capture devices 330.

Figure 7:
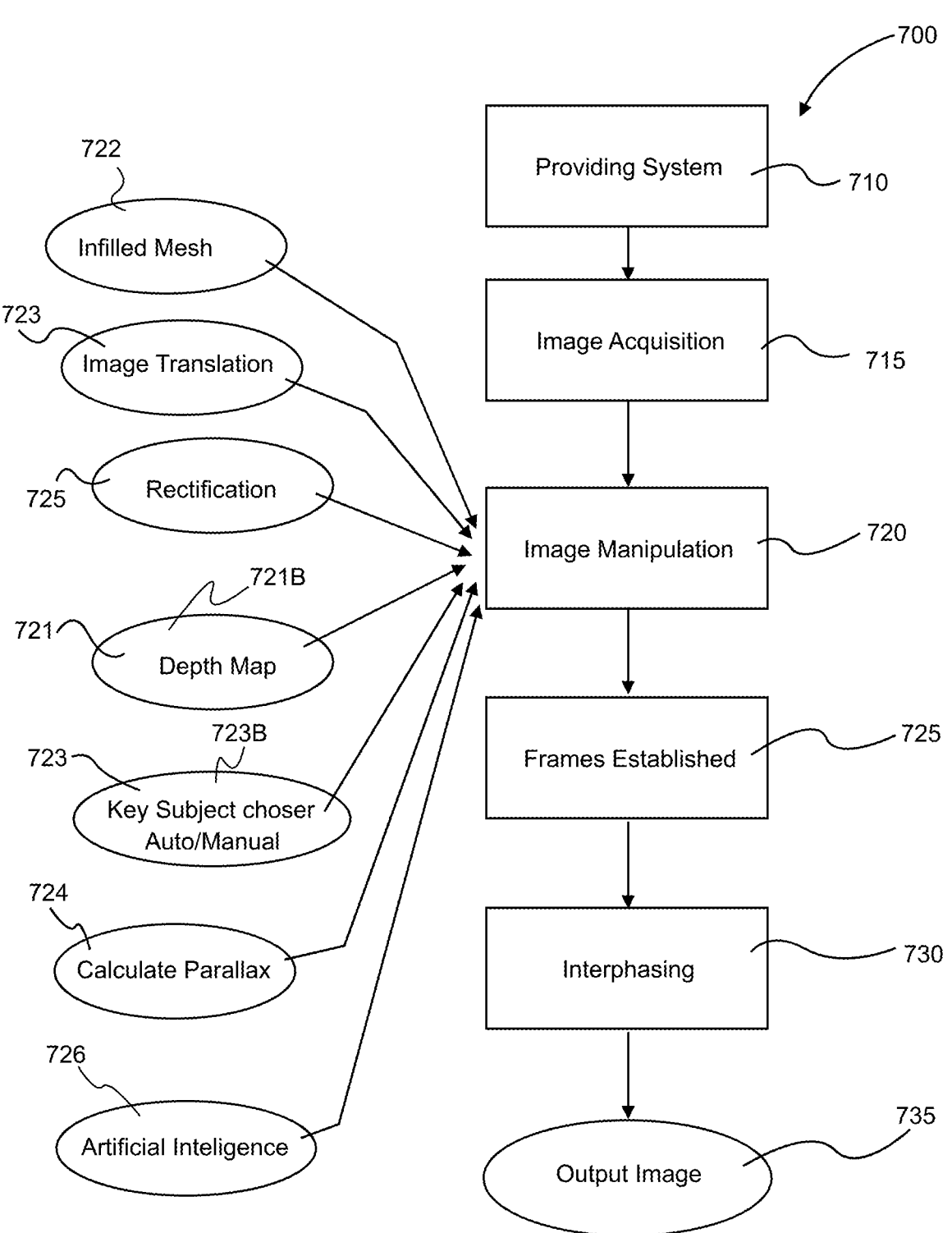
FIG. 7 is an exemplary embodiment of a flow diagram of a method of generating a multidimensional image(s) from the 2D digital images shown in FIG. 8A, first 2D digital image captured utilizing capture device shown in FIG. 3 and second 2D digital image generated therefrom the first.

Referring now to FIG. 7, there is illustrated process steps as a flow diagram 700 of a method of acquiring and converting the acquired stereoscopic images into a 3-D image as performed by a computer system 10, and viewable on display 208. In block or step 710, providing computer system 10 having image capture device 330 and configured display 208, as described above in FIGS. 1-6, to enable capture of a first 2-dimensional (2D) stereo image and generate a simulated second 2-dimensional (2D) stereo image with a disparity approximately intraocular or inter-pupillary distance width IPD, the distance between an average human's pupil, and displaying 3-dimensional viewable image.

In block or step 715, computer system 10 via image capture application 206 (method of capture) is configured to capture one 2D digital image of scene S via image capture module 330 having at least one image capture devices 331 (raster format) as first two dimensional digital image, as left image 810L or right image 810R of scene S from image capture device 331. This monocular image capture devices differs from binocular two image capture devices where you have a stereo pair) left and right images from two capture devices.

It is recognized herein that user U may be instructed on best practices for capturing image of scene S via computer system 10 via image capture application 206 and display 208, such as frame the scene S to include the key subject KS in scene S, selection of the prominent foreground feature of scene S, and furthest point FP in scene S, may include two or more of the key subject(s) KS in scene S, selection of closest point CP in scene S, the prominent background feature of scene S and the like. Moreover, position key subject(s) KS in scene S a specified distance from image capture device 331. Furthermore, position closest point CP in scene S a specified distance from image capture device 331.

Alternatively, in block or step 715, user U may utilize computer system 10, display 208, and application program(s) 206 to input, source, receive, or download image to computer system 10, such as via AirDrop.

It is recognized herein that step 715, computer system 10 via image capture application 206, image manipulation application 206, image display application 206 may be performed utilizing distinct and separately located computer systems 10, such as one or more user systems 220 first smart device, 222 second smart device, 224 third smart device (smart devices) and application program(s) 206. For example, using a camera system remote from image manipulation system, and remote from image viewing system, step 715 may be performed proximate scene S via computer system 10 (first processor) and application program(s) 206 communicating between user systems 220, 222, 224 and application program(s) 206. Here, camera system may be positioned or stationed to capture segments of different viewpoints of an event or entertainment, such as scene S. Next, via communications link 240 and/or network 250, or 5G computer systems 10 and application program(s) 206 via more user systems 220, 222, 224 may capture and transmit a plurality of digital images of scene S as left image 810L or right image 810R of scene S from capture device 318 relative to key subject KS point.

As an example, a scene, portrait, basket, batter's box, goal, position player, concert singer, lead instrument, or other entertainment or event space, or personnel as scene S, may be configured with capture devices 331 of scene S from specific advantage points. This computer system 10 via image capture application 206 may be utilized to analyze events to determine correct outcome, such as instant replay or video assistance referee (VAR). This computer system 10 via image capture application 206 may be utilized to capture a digital image of scene S as left image 810L or right image 810R of scene S. This computer system 10 via image capture application 206 may be utilized to capture a digital images of scene S as left image 810L or right image 810R of entertainment or event space, as scene S.

An additional example, a vehicle vantage or view point of scene S about the vehicle, wherein a vehicle may be configured with a capture devices 331 of scene S from specific advantage points of the vehicle. This computer system 10 (first processor) via image capture application 206 and capture devices 331 may be utilized to capture multiple two digital images of scene S as left image 810L or right image 810R of scene S from different positions around vehicle, especially an auto piloted vehicle, autonomous driving, agriculture, warehouse, transportation, ship, craft, drone, and the like.

Images captured and generation at or near interpupillary distance IPD matches the human visual system, which simplifies the math, minimizes cross talk between the two images, reduces fuzziness and image movement to produce digital multi-dimensional image viewable on display 208.

Figure 8A:
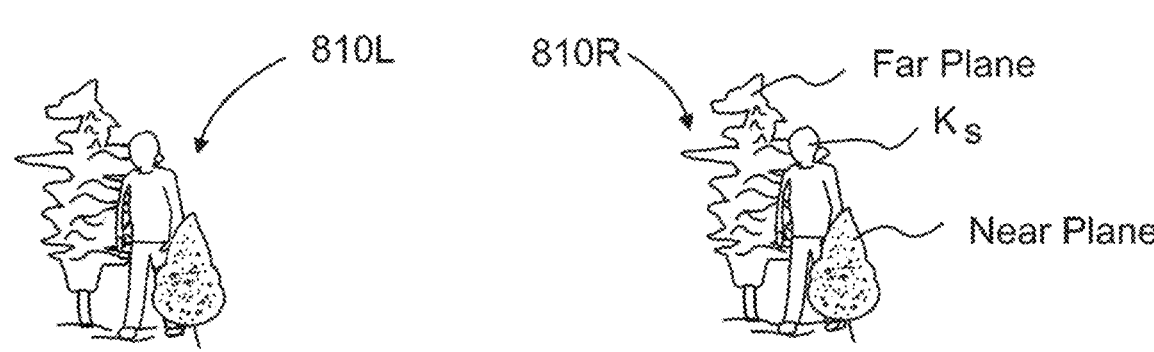
FIG. 8A is a top view illustration of an exemplary embodiment of an infilled mesh of a scene captured utilizing capture devices shown in FIG. 3.
Figure 8B:
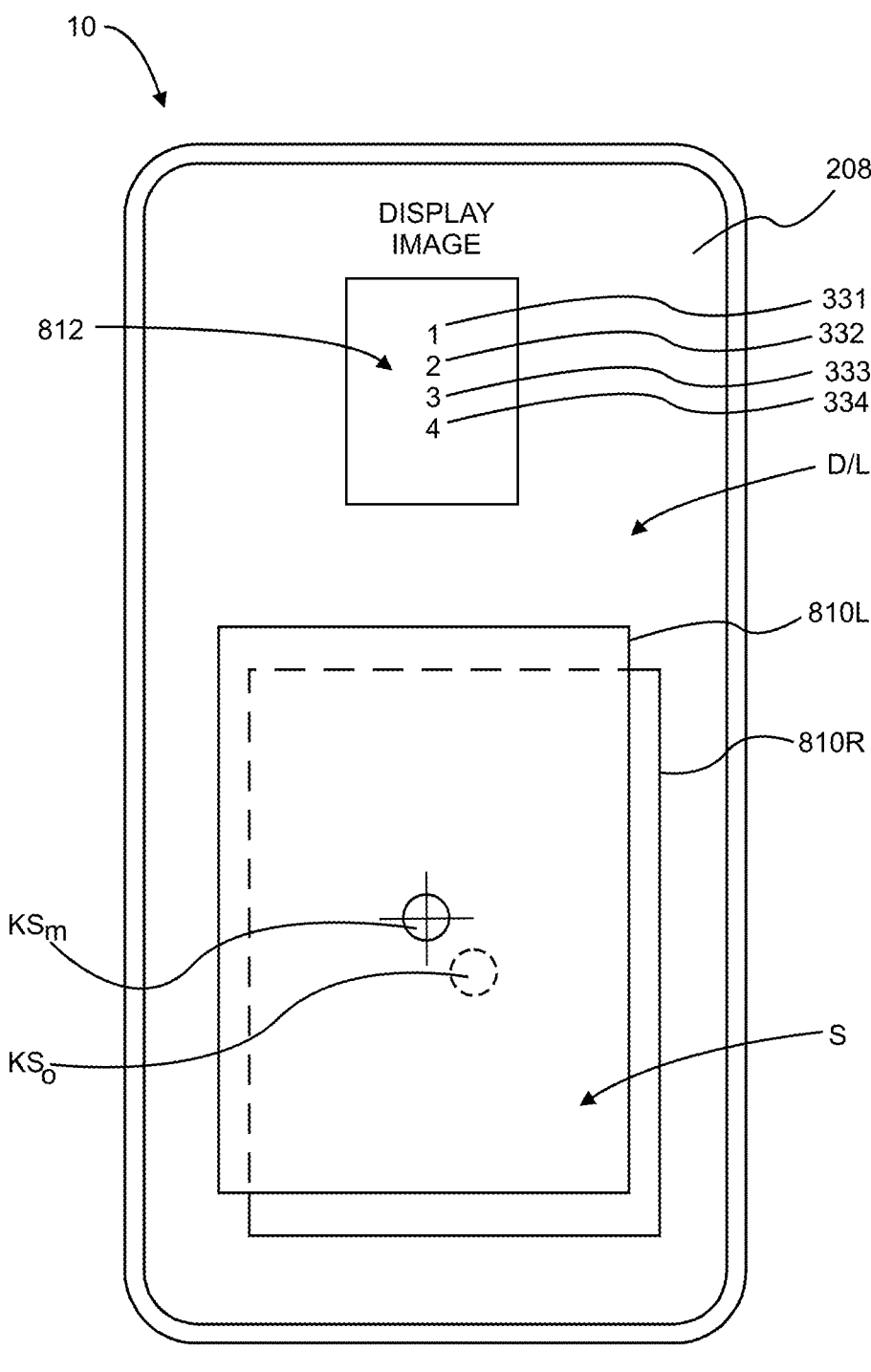
FIG. 8B is a top view illustration of an exemplary embodiment of a display of computer system running an application.
Figure 9:
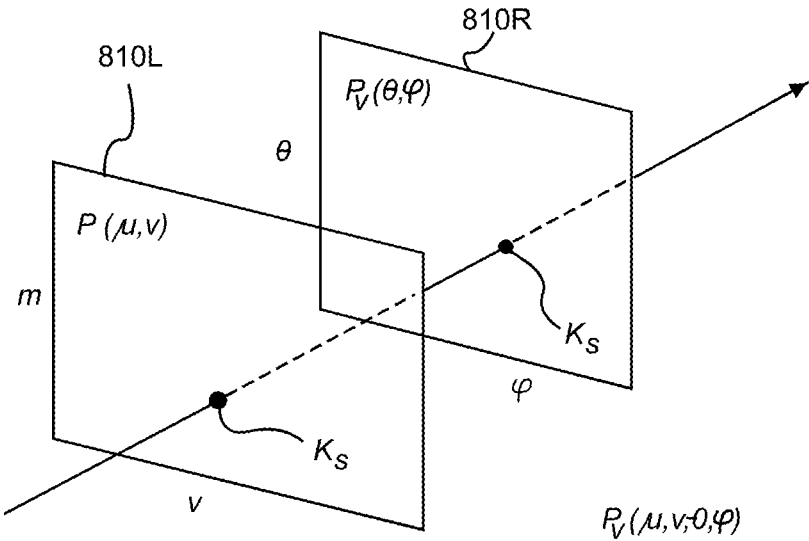
FIG. 9 is a diagram illustration of an exemplary embodiment of a geometrical shift of a point between two images (frames), such as in FIG. 8A according to select embodiments of the instant disclosure.

Additionally, in block or step 715, utilizing computer system 10, display 208, and application program(s) 206 (via image capture application) settings to align(ing) or position (ing) an icon, such as cross hair 814, of FIG. 8B, on key subject KS of a scene S displayed thereon display 208, for example by touching or dragging image of scene S or pointing computer system 10 in a different direction to align cross hair 814, of FIG. 8B, on key subject KS of a scene S. In block or step 715, obtaining or capturing images (n) of scene S from image capture device 331 focused on selected depths in an image or scene (depth) of scene S.

Additionally, in block or step 715, integrating I/O devices 202 with computer system 10, I/O devices 202 may include one or more sensors 340 in communication with computer system 10 to measure distance between computer system 10 and selected depths in scene S (depth) such as Key Subject KS and set the focal point of image capture devices 331. It is contemplated herein that computer system 10, display 208, and application program(s) 206, may operate in auto mode wherein one or more sensors 340 may measure the distance between computer system 10 and selected depths in scene S (depth) such as Key Subject KS and set parameters of image capture devices 331. Alternatively, in manual mode, a user may determine the correct distance between computer system 10 and selected depths in scene S (depth) such as Key Subject KS. Or computer system 10, display 208 may utilize one or more sensors 340 to measure distance between computer system 10 and selected depths in scene S (depth) such as Key Subject KS and provide on screen instructions or message (distance preference) to instruct user U to move closer or father away from Key Subject KS to optimize image capture devices 331.

In block or step 720, computer system 10 via image manipulation application 206 is configured to receive left image 810L or a right image 810R of scene S captured by image capture device 331 through an image acquisition application. The image acquisition application converts each stereographic image (raster) to a digital source image, such as a JPEG, GIF, TIF format. Ideally, each digital source image includes a number of visible objects, subjects or points therein, such as foreground or closest point associated with a near plane, background or furthest point associated with a far plane, and a key subject KS. The foreground and background point are the closest point and furthest point from the viewer. The depth of field is the depth or distance created within the object field (depicted distance between foreground to background). The principal axis is the line perpendicular to the scene passing through the key subject KS point, while the parallax is the displacement of the key subject KS point from the principal axis. In digital composition the displacement is preferably maintained as a whole integer number of pixels from the principal axis.

It is recognized herein that step 720, computer system 10 via image capture application 206, image manipulation application 206, image display application 206 may be performed utilizing distinct and separately located computer systems 10, such as one or more user systems 220, 222, 224 and application program(s) 206. For example, using an image manipulation system remote from image capture system, and remote from image viewing system, step 720 may be performed remote from scene S via computer system 10 (third processor) and application program(s) 206 communicating between user systems 220, 222, 224 and application program(s) 206. Next, via communications link 240 and/or network 250, or 5G computer systems 10 (third processor) and application program(s) 206 via more user systems 220, 222, 224 may receive sets of images (n) of scene S from capture devices 331 relative to key subject KS point and transmit a manipulated digital images of scene S as left image 810L or right image 810R of scene S as digital multi-dimensional images 1010 to computer system 10 (first processor) and application program(s) 206.

In block or step 721, computer system 10 via image manipulation application 206 is configured to create depth map 721B of source image, left image 810L or right image 810R of scene S and makes a grey scale image of source image, left image 810L or right image 810R of scene S as shown in FIGS. 7A1 and 7A2. Monocular depth estimation (MDE) is an image manipulation application 206 task that involves predicting the depth information of source image, left image 810L or right image 810R of scene S from image capture device 331. The goal is to estimate the depth value (distance in scene S relative to image capture device 331) of each pixel given a single RGB image. MDE is a key prerequisite for determining scene understanding for applications such as 3D scene reconstruction, autonomous driving, and augmented reality (AR).

Traditional depth estimation methods are usually based on a binocular camera. The camera calculates the disparity of two 2D images through stereo matching and triangulation to obtain a depth map. Monocular depth estimation using image manipulation application 206 is a solution to the high cost, sparse signal, and calibration problem of traditional approaches. The image manipulation application 206 predicts depth information of source image, left image 810L or right image 810R of scene S from image capture device 331.

Image manipulation application 206 may generate a grayscale image of source image, left image 810L or right image 810R of scene S from image capture device 331 having (0-255 scale) with white W representing objects closest to capture device 331 (or sensor), gray G inbetween, and black B representing objects farthest from capture device 331. The various gray values representing the space in between those close/far objects represented by pixels.

For example, this provides more information as volume, texture and lighting are more fully defined in depth map 721B. Once depth map 721B is generated then the parallax can be tightly controlled as via control of the viewing angle A for the generation of multidimensional image 1010 used in the final output stereo image.

When using a depth map technique 721, frames are generated by a virtual camera set at different angles, camera angle rotation between 1-180 degrees), as second two dimensional digital image, as left image 810L or right image 810R of scene S from image capture device 331. The angles for this device are set so the outer extremes correspond to the angles subtend by the human visual system, i.e., the inter-pupillary distance.

Image manipulation application 206 may utilize Python and Git clone to generate a grayscale image of source image, left image 810L or right image 810R of scene S from image capture device 331 having (0-255 scale). As an example tool to generate a depth map see https://github.com/AUTO-MATIC1111/stable-diffusion-webui.git on Github. Next add the Depth map extension and launch script.

It is contemplated herein that computer system 10 may utilize machine learning or artificial intelligence (AI) to generate a grayscale image of source image, left image 810L or right image 810R of scene S from image capture device 331 having (0-255 scale) with white W representing objects closest to capture device 331 (or sensor), gray G inbetwe4en, and black B representing objects farthest from capture device 331. Machine learning or artificial intelli-gence (AI) may be utilized to adjust it to the specific use of the Z-track, utilize a saliency map created by a network that trains on image data collected from standard depth map tools, and train the algorithm to capture the semantic of the image and to know what to delete from the grayscale image of source image. Computer system 10 may use DNN support with opencv in iOS, which integrates with https://github-.com/nianticlabs/monodepth2 and is supported by https://github.com/opencv/opencv/wiki/Deep-Learning-in-OpenCV #depth-estimation.

In block or step 722, computer system 10 via image manipulation application 206 is configured to generate an infilled mesh 722B from depth map 721B in block or step 721 of source image, left image 810L or right image 810R of scene S from image capture device 331. A 2D image contains a singular perspective. Viewing objects in the image from a different angle reveals occluded areas or holes. Creating multi-dimensional imagery requires filling in the holes. Using context aware generative infill techniques, these holes can be rendered via image manipulation appli-cation 206 to look like the surrounding scenery of scene S. The resulting infilled mesh scene S may be output in .ply format via image manipulation application 206. PLY format is a computer file format known as the Polygon File Format or the Stanford Triangle Format. It was principally designed to store three-dimensional data from 3D scanners. The data storage format supports a relatively simple description of a single object as a list of nominally flat polygons. A variety of properties can be stored, including color and transpar-ency, surface normals, texture coordinates and data confi-dence values. The format via image manipulation applica-tion 206 permits different properties for the front and back of a polygon. The infilled image is mapped to a .ply mesh representing the geometry of the scene. The z values of the scene are projected from the depth map data.

Image manipulation application 206 may utilize Python and Git clone to generate infilled mesh IM 723 B from depth map 721B in block or step 721 of source image, left image 810L or right image 810R of scene S from image capture device 331 via 3D Inpainted Mesh tool, as shown in FIG. 7A3. As an example tool to generate infilled mesh see Context-aware Layered Depth Inpainting https:// github.com/vt-vl-lab/3d-photo-inpainting where image manipulation application 206 estimate the depth of the selected image based on the midas depth model and save a.png file with the depth information in grayscale. Image manipulation application 206 may produce an infilled mesh from the color image and the grayscale depth map 721B of source image, left image 810L or right image 810R of scene S from image capture device 331. The resulting mesh will be saved as a .ply file.

In block or step 723, computer system 10 via key subject application 206 is configured to identify a key subject KS in source image, left image 810L or right image 810R of scene S. Key subject KS identified in left image 810L or right image 810R corresponds to the same key subject KS of scene S.

By default, 3D design tools assign a point of origin to a mesh, such as infilled mesh, that corresponds to the far Z plane or sometimes the geometric center of the mesh. This origin point allows manipulation of the mesh, in 3D space, centering on that origin point. However, this origin point or the geometric center of the mesh does not always align with the convergence point of the scene S or the key subject KS. Reassigning the origin point to the key subject KS of the scene S allows for dimensional projection of the mesh. Disparity in both foreground and background objects or points in the scene become defined by the key subject KS and represent convergence of the human visual system. Parallax shows the spatial relationship as a motion differ-ential between elements in front of or behind the key subject KS where virtually zero motion is perceived from the key subject KS.

As an example tool to assign the Key Subject see Blender 3D CG at https://www.blender.org/. In Blender 3D import the. ply mesh file select the key subject KS of the scene S using and moving the cursor tool to desired location of key subject KS, right click the mesh, and Set Origin to Cursor to identify key subject KS in source image, left image 810L or right image 810R of scene S. For example, click the Shading tab, select the mesh and click+New to add a material, add a Color Attribute, add an Emission Shader, connect the color out on the Color Attribute to the color in on the Emission Shader, connect the Emission out to the Surface in on the Material Output, Click the layout tab, set the viewport shading to Material Preview, select the key subject from the mesh using the cursor tool, right click the mesh and Set Origin to Cursor.

Moreover, in an auto mode computer system 10 via key subject application 206 may identify the key subject KS based on a depth map 720B of the source images, left image 810L or right image 810R of scene S.

Similarly, computer system 10 via key subject application 206 may identify a foreground, closest point and back-ground, furthest point using depth map 720B of the source images, left image 810L or right image 810R of scene S. Alternatively in manual mode, computer system 10 via image manipulation application and display 208 may be configured to enable user U may to select or identify key subject KS in the source images, left image 810L or right image 810R of scene S and computer system 10 via image manipulation application performs a horizontal image trans-lation to align stacked left image 810L and right image 810R of scene S about Key subject KS. User U may tap, move a cursor or box or other identification to select(ing) or identify key subject KS in the source images, left image 810L and right image 810R of scene S, as shown in FIG. 8B.

Source images, left image 810L or right image 810R of scene S are all obtained or created with image capture devices 331 with the same focal length. Computer system 10 via key subject application 206 creates a point of certainty, key subject KS point by performing a horizontal image shift of source image, left image 810L or right image 810R of scene S to create second image, left image 810L or right image 810R of scene S, whereby images, left image 810L and right image 810R of scene S overlap at this one point. This image shift does two things, first it sets the depth of the image. All points in front of key subject KS point are closer to the observer and all points behind key subject KS point are further from the observer.

Moreover, in block or step 723, utilizing computer system 10 via key subject application 206 to identify(ing) at least in part a pixel, set of pixels (finger point selection on display 208) in one or more images (n) of scene S from capture devices 331 as key subject KS, respectively and align images horizontally about key subject KS; (horizontal image translation (HIT) stereo pair images (see codeproject.com as example) relative to lenticular lens 540) overlapping therein each images (n) of scene S from capture devices 331 with a distance KS within a Circle of Comfort relationship to optimize digital multi-dimensional images 1010 for the human visual system.

In block or step 726, that computer system 10 may utilize machine learning or artificial intelligence (AI) to perform key subject application 206. Machine learning or artificial intelligence (AI) enables computer system 10 to learn from data and make informed decisions without explicit programming. AI Steps: Data Collection: Machine learning starts with collecting relevant data, such as source images, left image 810L or right image 810R of scene S are all obtained or created with image capture devices 331. Modeling: Machine learning algorithms are used to build models. These models learn patterns and relationships in manual or automatic identify (ing) at least in part a pixel, set of pixels (finger point selection on display 208) in one or more images (n) as in left image 810L or right image 810R of scene S from capture devices 331 as key subject KS. Common types of models include decision trees, neural networks, and support vector machines. Training: During training, the model learns from the data of prior key subject KS selections in prior source images obtained or created with image capture devices 331. It adjusts its internal parameters to minimize prediction errors. The goal is to find the best representation of the underlying patterns. Tuning: Model performance can be improved by tuning hyperparameters (settings that control the learning process). Cross-validation helps select the best hyperparameters. Evaluation: The trained model is evaluated using test data that it hasn't seen before. For example, subsequent one or more images (n) as in left image 810L or right image 810R of scene S from capture devices 331, which have key subject KS selections approved by user U. Deployment: Once satisfied with the machine learning or artificial intelligence (AI) performance, it may be deployed to identify (ing) at least in part a pixel, set of pixels (finger point selection on display 208) in one or more images (n) as in left image 810L or right image 810R of scene S from capture devices 331 as key subject KS.

In block or step 723, computer system 10 via key subject application 206 select (ing) add (ing) a camera, zero the camera, set the camera X rotation to between 0-180°, toggle user view to camera view to generate the second image as left image 810L or right image 810R of scene S about Key subject KS as shown in FIG. 8A. Save second image as left image 810L or right image 810R of scene S about Key subject KS.

It is contemplated herein that computer system 10 may utilize machine learning or artificial intelligence (AI) to generate the second image as left image 810L or right image 810R of scene S about Key subject KS as shown in FIG. 8A and step 723 select (ing) add(ing) a camera, zero the camera, set the camera X rotation to between 0-180°, toggle user view to camera view to generate the second image as left image 810L or right image 810R of scene S about Key subject KS as shown in FIG. 8A. Save second image as left image 810L or right image 810R of scene S about Key subject KS.

It is further contemplated herein that computer system 10 may be utilize machine learning or artificial intelligence (AI) to perform other tasks set forth in FIG. 7.

Moreover, in block or step 723, utilizing computer system 10 performs a horizontal image translation to align stacked left image 810L and right image 810R of scene S about Key subject KS.

It is contemplated herein that a computer system 10, display 208, and application program(s) 206 may perform an algorithm or set of steps to automatically identify and align key subject KS therein at least two images (n) of scene S from capture device 331 (n devices). In block or step 723, utilizing computer system 10, (in manual mode), display 208, and application program(s) 206 settings to at least in part enable a user U to align(ing) or edit alignment of a pixel, set of pixels (finger point selection), key subject KS point of at least two images (n) of scene S from capture devices 331-334 (n devices). Moreover, computer system 10 and application program(s) 206 may enable user U to perform frame enhancement, layer enrichment, feathering (smooth) the images (n) together, or other software techniques for producing 3D effects to display. It is contemplated herein that a computer system 10 (auto mode), display 208, and application program(s) 206 may perform an algorithm or set of steps to automatically perform align(ing) or edit alignment of a pixel, set of pixels of key subject KS point of at least two images (n) of scene S from capture devices 331-334 (n devices).

In block or step 724, utilizing computer system 10 to calculate the minimum parallax and maximum parallax as a function of number of pixel, pixel density and number of frames, and closest and furthest points, and other parameters as set U.S. Pat. Nos. 9,992,473, 10,033,990, and 10,178,247, incorporated herein by reference in their entirety.

It is recognized herein that two images of scene S from source images, left image 810L and right image 810R of scene S one obtained and one created with image capture devices 331 with the same focal length introduces a (left and right) binocular disparity to display a multidimensional digital image 1010 for user U.

In block or step 725, computer system 10 via rectification application 720C (206) is configured to transforms each source image, left image 810L and right image 810R of scene S to align the identified key subject KS in the same pixel space. Horizontal and vertical alignment of each source image, left image 810L and right image 810R of scene S, requires a dimensional image format (DIF) transform. The DIF transform is a geometric shift that does not change the information acquired at each point in the source image, left image 810L and right image 810R of scene S, but can be viewed as a shift of each point in the source image, left image 810L and right image 810R of scene S, in Cartesian space (illustrated in FIG. 9). As a plenoptic function, the DIF transform is represented by the equation:

$$P'(u, v) \times P'(\theta, \varphi) = [P_{u,v} + \Delta_{u,v}] \times [P_{\theta,\varphi} + \Delta_{\theta,u}]$$

Where $\Delta u$, $v = \Delta\theta,\phi$

In the case of a digital image source, the geometric shift corresponds to a geometric shift of pixels which contain the plenoptic information, the DIF transform then becomes:

$$(Pixel)_{x,y} = (Pixel)_{x,y} + \Delta_{x,y}$$

Moreover, computer system 10 via frame establishment application 206 may also apply a geometric shift to the background and or foreground using the DIF transform. The background and foreground may be geometrically shifted according to the depth of each relative to the depth of the key subject KS identified by the depth map 720B of the source image. Controlling the geometrical shift of the background and foreground relative to the key subject KS controls the motion parallax of the key subject KS. As described, the apparent relative motion of the key subject KS against the background or foreground provides the observer with hints about its relative distance. In this way, motion parallax is controlled to focus objects at different depths in a displayed scene to match vergence and stereoscopic retinal disparity demands to better simulate natural viewing conditions. By adjusting the focus of key subjects KS in a scene to match their stereoscopic retinal disparity (an intraocular or inter-pupillary distance width IPD (distance between pupils of human visual system), the cues to ocular accommodation and vergence are brought into agreement.

In block or step 730, computer system 10 via interphasing application 730 (206) is configured to interphase columns of pixels of each source image, left image 810L and right image 810R of scene S to generate a multidimensional digital image aligned to the key subject KS point and within a calculated parallax range. Interphasing application 730 may be configured to takes sections, strips, rows, or columns of pixels, such as column 1002 of the source images, left image 810L and right image 810R of scene S and layer them alternating between column 1002 of left image 810L and column 1002 of right image 810R and reconfigures or lays them out in series side-by-side interlaced, such as in repeating series 1004 two columns wide, and repeats this configuration for all layers of the source images, left image 810L and right image 810R of scene S to generate multidimensional image 1010 with column 1002 dimensioned to be one pixel 550. For interlacing stereo pair images (see codeproject.com as example) relative to lenticular lens 540 (or other viewing functionality, such as barrier screen, lenticular, parabolic, overlays, waveguides, micro optical material (MOM), black line, digital black line and the like (at least one layer). Three-Dimensional Display Technology, pages 1-80, by Jason Geng of other display techniques that may be utilized to produce a multidimensional digital image on display 208) overlapping therein each images (n) of scene S from capture devices 331-334 (n devices).

This configuration provides multidimensional image 1010 a dimensional match with left and right pixel 550L/R light passes through lenticular lens 540 and bends or refracts to provide 3D viewing of multidimensional image 1010 on display 208 to left eye LE and right eye RE a viewing distance VD from pixel 550.

It is contemplated herein that column 1002 of the source images, left image 810L and right image 810R match size and configuration of pixel 550 of display 208.

Figure 10:
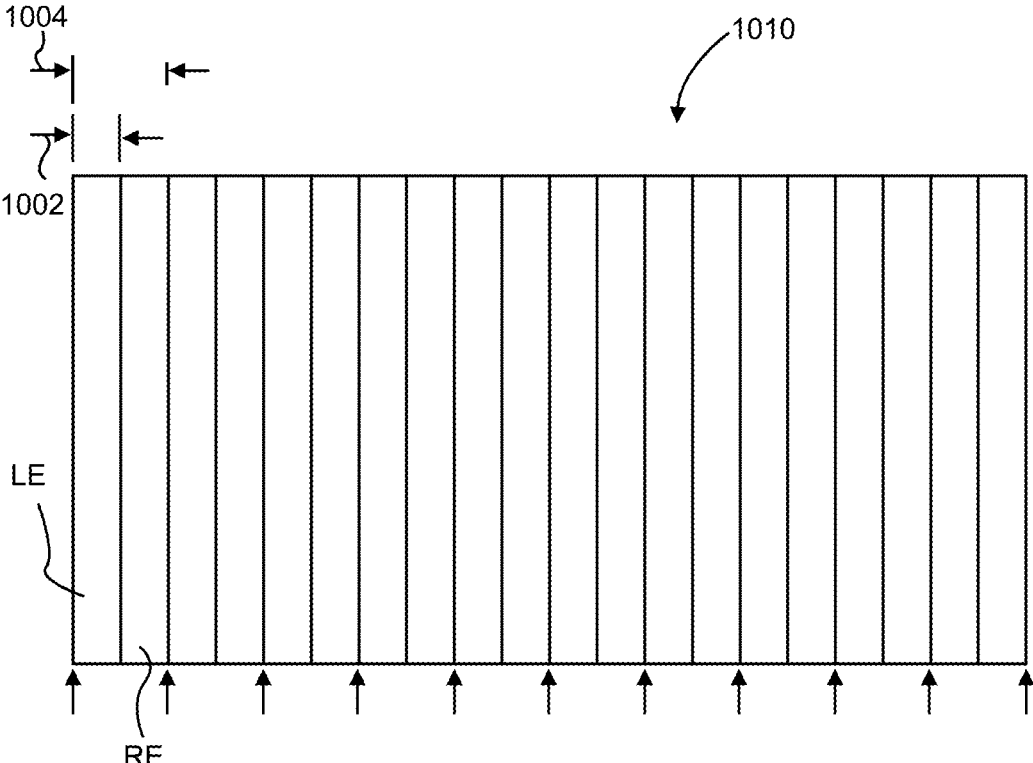
FIG. 10 is a diagram illustration of an exemplary embodiment of a pixel interphase processing of images (frames), such as in FIG. 8A according to select embodiments of the instant disclosure.

Alternatively, computer system 10 via interphasing application 730 (206) is configured to interphase columns of pixels of each source image, left image 810L via image capture devices 331, center image 810C via image capture devices 332 or 333, and right image 810R via image capture devices 333 or 334 of scene S to generate a multidimensional digital image aligned to the key subject KS point and within a calculated parallax range. As shown in FIG. 10, interphasing application 730 may be configured to takes sections, strips, rows, or columns of pixels, such as column 1002 of the source images, left image 810L, center image 810C, and right image 810R of scene S and layer them alternating between column 1002 of left image 810L, (or column 1002 of center image 810C,) and column 1002 of right image 810R and reconfigures or lays them out in series side-by-side interlaced, such as in repeating series 1004 two to three columns wide, and repeats this configuration for all layers of the source images, left image 810L, (or center image 810C), and right image 810R of scene S to generate multidimensional image 1010 with column 1002 dimensioned to be one pixel 550 wide.

This configuration provides multidimensional image 1010 a dimensional match with center pixel 550C light passes through lenticular lens 540 as center light 560C to provide 2D viewing of multidimensional image 1010 on display 208 to left eye LE and right eye RE a viewing distance VD from pixel 550 and left and right pixel 550L/R light passes through lenticular lens 540 and bends or refracts to provide 3D viewing of multidimensional image 1010 on display 208 to left eye LE and right eye RE a viewing distance VD from pixel 550.

Now given the multidimensional image 1010, with the associated circle of confusion we move to observe the viewing side of the device.

It is contemplated herein that additional image editing may be performed by utilizing computer system 10, display 208, and application program(s) 206 to crop, zoom, align or perform other edits thereto each image (n) of scene S from capture devices 331-334 (n devices) to enable images (n) of scene S to display a multidimensional digital image of scene S on display 208 for different dimensions of displays 208. It is contemplated herein that computer system 10, display 208, and application program(s) 206 may be responsive in that computer system 10 may execute an instruction to size each images (n) of scene S to fit the dimensions of a given display 208. Moreover, computer system 10 and application program(s) 206 may include edits, such as frame enhancement, layer enrichment, feathering, (Photoshop or Acorn photo or image tools), to smooth or fill in the images (n) together, and other software techniques for producing 3D effects to display 3-D multidimensional image of scene S thereon display 208. It is contemplated herein that a computer system 10, display 208, and application program(s) 206 may perform an algorithm or set of steps to automatically or manually edit or apply effects to at least two images (n) of scene S from capture devices 331-334.

It is recognized herein that steps 720-730, may be performed by computer system 10 via image manipulation application 206 utilizing distinct and separately located computer systems 10, such as one or more user systems 220, 222, 224 and application program(s) 206 performing steps herein. For example, using an image processing system remote from image capture system, and from image viewing system, steps 720-735 may be performed remote from scene S via computer system 10 and application program(s) 206 and communicating between user systems 220, 222, 224 and application program(s) 206 via communications link 240 and/or network 250, or via wireless network, such as 5G, computer systems 10 and application program(s) 206 via more user systems 220, 222, 224. Here, computer system 10 via image manipulation application 206 may manipulate left image 810L and right image 810R of scene S to generate a multidimensional digital image aligned (aligning) to the key subject KS point and transmit display multidimensional image 1010 to one more user systems 220, 222, 224 via communications link 240 and/or network 250, or via wireless network, such as 5G computer systems 10 and application program(s) 206.

Moreover, it is recognized herein that steps 720-730, may be performed by computer system 10 via image manipulation application 206 utilizing distinct and separately located computer systems 10 positioned on the vehicle. For example, using an image processing system remote from image capture system, steps 720-735 via computer system 10 and application program(s) 206 computer systems 10 may manipulate left image 810L and right image 810R of scene S to generate a multidimensional digital image 1010 aligned to the key subject KS point. Here, computer system 10 via image manipulation application 206 may utilize multidimensional image 1010 to navigate the vehicle through scene S.

In block or step 720, utilizing computer system 10, display 208, and application program(s) 206 to crop, zoom, align or perform other edits thereto each image left image 810L and right image 810R of scene S to enable images (n) of scene S to display a multidimensional digital image of scene S on display 208 for different dimensions of displays 208. It is contemplated herein that computer system 10, display 208, and application program(s) 206 may be responsive in that computer system 10 may execute an instruction to size each images (n) of scene S to fit the dimensions of a given display 208. Moreover, computer system 10 and application program(s) 206 may include edits, such as frame enhancement, layer enrichment, feathering, (Photoshop or Acorn photo or image tools), to smooth or fill in the images (n) together, and other software techniques for producing 3D effects to display 3-D multidimensional image 1010 of scene S thereon display 208. It is contemplated herein that a computer system 10, display 208, and application program(s) 206 may perform an algorithm or set of steps to automatically or manually edit or apply effects to at least two images (n) of scene S from capture devices 331-334.

In block or step 735, computer system 10 via output application 730 (206) may be configured to display multidimensional image 1010 on display 208. Multidimensional image 1010 may be displayed via left and right pixel 550L/R light passes through lenticular lens 540 and bends or refracts to provide 3D viewing of multidimensional image 1010 on display 208 to left eye LE and right eye RE a viewing distance VD from pixel 550.

In block or step 735, utilizing computer system 10, display 208, and application program(s) 206 settings to configure each images (n) (L&R segments) of scene S from capture device 331 as left image 810L and right image 810R of scene S simultaneously with Key Subject aligned between images for binocular disparity for display/view/save (saving) multi-dimensional digital master image(s) 1010 on display 208, wherein a difference in position of each images (n) of scene S from capture device 331 as left image 810L and right image 810R of scene S relative to key subject KS plane introduces a (left and right) binocular disparity to display a multidimensional digital image 1010 on display 208 to enable user U, in block or step 735 to view multidimensional digital image on display 208.

Moreover, in block or step 735, computer system 10 via output application 730 (206) may be configured to display multidimensional image(s) 1010 on display 208 for one more user systems 220, 222, 224 via communications link 240 and/or network 250, or 5G computer systems 10 and application program(s) 206.

It is contemplated herein that computer system 10 via output application 730 (206) may be configured to enable display of multidimensional digital image(s) on display 208 to enable a plurality of user U, in block or step 735 to view multidimensional digital image 1010 on display 208 live or as a replay/rebroadcast.

It is recognized herein that step 735, may be performed by computer system 10 via output application 730 (206) utilizing distinct and separately located computer systems 10, such as one or more user systems 220, 222, 224 and application program(s) 206 performing steps herein. For example, using an output or image viewing system, remote from scene S via computer system 10 and application program(s) 206 and communicating between user systems 220, 222, 224 and application program(s) 206 via communications link 240 and/or network 250, or via wireless network, such as 5G, computer systems 10 and application program(s) 206 via more user systems 220, 222, 224. Here, computer system 10 output application 730 (206) may receive manipulated plurality of two digital images of scene S as left image 810L and right image 810R of scene S and display left image 810L and right image 810R of scene S to generate a multidimensional digital image aligned to the key subject KS point and to display multidimensional image 1010 to one more user systems 220, 222, 224 via communications link 240 and/or network 250, or via wireless network, such as 5G computer systems 10 and application program(s) 206.

Figure 11:
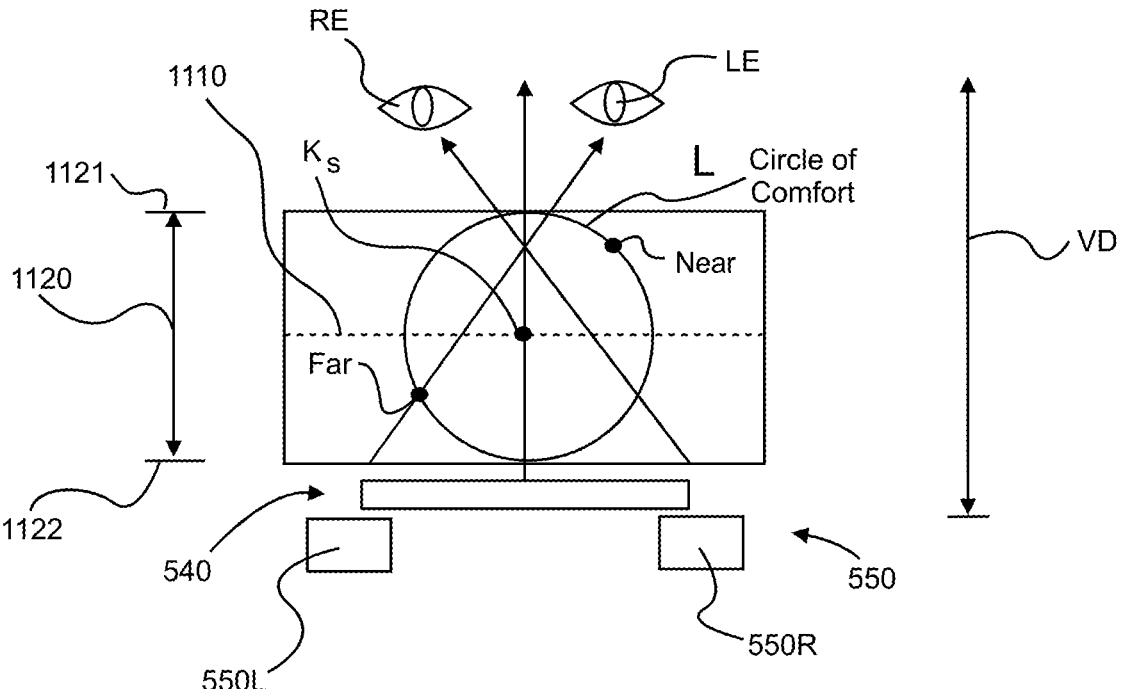
FIG. 11 is a top view illustration of an exemplary embodiment of viewing a multidimensional digital image on display with the image within the Circle of Comfort, proximate Horopter arc or points, within Panum area, and viewed from viewing distance.

Referring now to FIG. 11, there is illustrated by way of example, and not limitation a representative illustration of Circle of Comfort CoC fused with Horopter arc or points and Panum area. Horopter is the locus of points in space that have the same disparity as fixation, Horopter arc or points. Objects in the scene that fall proximate Horopter arc or points are sharp images and those outside (in front of or behind) Horopter arc or points are fuzzy or blurry. Panum is an area of space, Panum area 1120, surrounding the Horopter for a given degree of ocular convergence with inner limit 1121 and an outer limit 1122, within which different points projected on to the left and right eyes LE/RE result in binocular fusion, producing a sensation of visual depth, and points lying outside the area result in diplopia—double images. Moreover, fuse the images from the left and right eyes for objects that fall inside Panum's area, including proximate the Horopter, and user U will we see single clear images. Outside Panum's area, either in front or behind, user U will see double images.

It is recognized herein that computer system 10 via image capture application 206, image manipulation application 206, image display application 206 may be performed utilizing distinct and separately located computer systems 10, such as one or more user systems 220, 222, 224 and application program(s) 206. Next, via communications link 240 and/or network 250, wireless, such as 5G second computer system 10 and application program(s) 206 may transmit set of image of scene S from capture device 331) relative to key subject plane introduces a (left and right, left image 810L and right image 810R of scene S) binocular disparity to display a multidimensional digital image on display 208 to enable a plurality of user U, in block or step 735 to view multidimensional digital image on display 208 live or as a replay/rebroadcast.

As an example a basket, batter's box, goal, concert singer, instructors, entertainers, lead instrument, or other entertainment or event space could be configured with capture devices 331-334 (n devices) to enable display of multidimensional digital image(s) on display 208 to enable a plurality of user U, in block or step 735 to view multidimensional digital image on display 208 live or as a replay/rebroadcast.

Moreover, FIG. 11 illustrates display and viewing of multidimensional image 1010 on display 208 via left and right pixel 550L/R light of multidimensional image 1010 passes through lenticular lens 540 and bends or refracts to provide 3D viewing of multidimensional image 1010 on display 208 to left eye LE and right eye RE a viewing distance VD from pixel 550 with near object, key subject KS, and far object within the Circle of Comfort CoC and Circle of Comfort CoC is proximate Horopter arc or points and within Panum area 1120 to enable sharp single image 3D viewing of multidimensional image 1010 on display 208 comfortable and compatible with human visual system of user U.

Blockchain is a shared, ledger that facilitates the process of recording transactions and tracking assets in a network. An asset can be tangible (title to a house, car, cash, land, artwork or DIGY, 3D Stereo, Datasets thereof) or intangible (intellectual property, patents, copyrights, branding). A blockchain is a decentralized, distributed, and oftentimes public, digital ledger consisting of records called blocks that are used to record transactions across many computers using cryptography so that any involved block cannot be altered retroactively, without the alteration of all subsequent blocks. This allows the participants to verify and audit transactions independently. Each block contains data or Dataset, a cryptographic hash of the previous block (chain), a timestamp, and cryptographic hash (identifies block and all its content). The timestamp proves that the transaction data existed when the block was published to get into its hash. As blocks each contain information about the block previous to it, they form a chain, with each additional block reinforcing the ones before it. Therefore, blockchains are resistant to modification of their data because once recorded, the data in any given block cannot be altered retroactively without altering all subsequent blocks. If change a block then all following blocks invalid and have a different hash. Secure through Proof of Work mechanism slows down transaction rate to create a new block plus distributed. Blockchains are typically managed by a peer-to-peer network, an open and decentralized database, for use as a publicly distributed ledger, where nodes collectively adhere to a protocol to communicate and validate new blocks. Each new block is sent to everyone on the network to verify the new block creating a consensus. Although blockchain records are not unalterable as forks are possible, blockchains may be considered secure by design via a distributed computing system.

Ethereum is a popular block chain standard as well as other private and open source blockchain algorithms.

DIGY, 3D Stereo, Datasets, and other datasets and any authentication documents verify creator or author, authenticity statements, history, date of origin, chain of title, chain of owners, or like (authentication) may be included in the dataset (Dataset). Dataset may be stored as a block on the blockchain network and each subsequent transaction thereafter related to Dataset may be set forth in subsequent blocks each contains a cryptographic hash of the previous block, a timestamp of the Dataset transaction data decentralized source of trust.

Utilize Non-fungible tokens—For select DIGY, DIGY sequences, or Stereo 3D image files, Datasets or other datasets—non-fungible token (NFT) are unique collectible crypto assets stored on blockchain with unique identification codes and metadata that distinguish DIGY, DIGY sequences, or Stereo 3D image file, Dataset, or dataset from any other digital content making it unique one of a kind or limited edition digital content. Enabling the creation of unique digital content and/or set numbers of copies—a certificate of authenticity for a one-of-a-kind or limited number of digital memorabilia that can't be duplicated. The memorabilia is stored on a blockchain network. It's 'non-fungible" because it can't be readily exchanged as similar reproducible content freely moving through the internet. Moreover, authenticating precious art work utilizing DIGY, DIGY sequences, or Stereo 3D image file, Dataset of artwork along with appraisal, and any authentication documents verify creator or author, authenticity statements, history, date of origin, chain of title, chain of owners, or like (authentication) may be included in the dataset (Dataset) and making an smart contract or NFT of Dataset.

An NFT is simply a record of who owns a unique piece of digital content. That content can be anything from art, music, photograph, 3D graphics, tweets, memes, games, videos, GIFs—you name it. If it's digital and it was created, it can be an NFT.

Current NFT digital content can be captured by a third party device and mass distributed via Internet by piracy and devalue the NFT digital content of standard NFT content.

Digital content herein are DIGYs and 3D Stereo images generated by artist users and creating their own NFT artwork based on DIGYs and 3D Stereo images using our DIGY and 3D Stereo platforms above.

Figure 12:
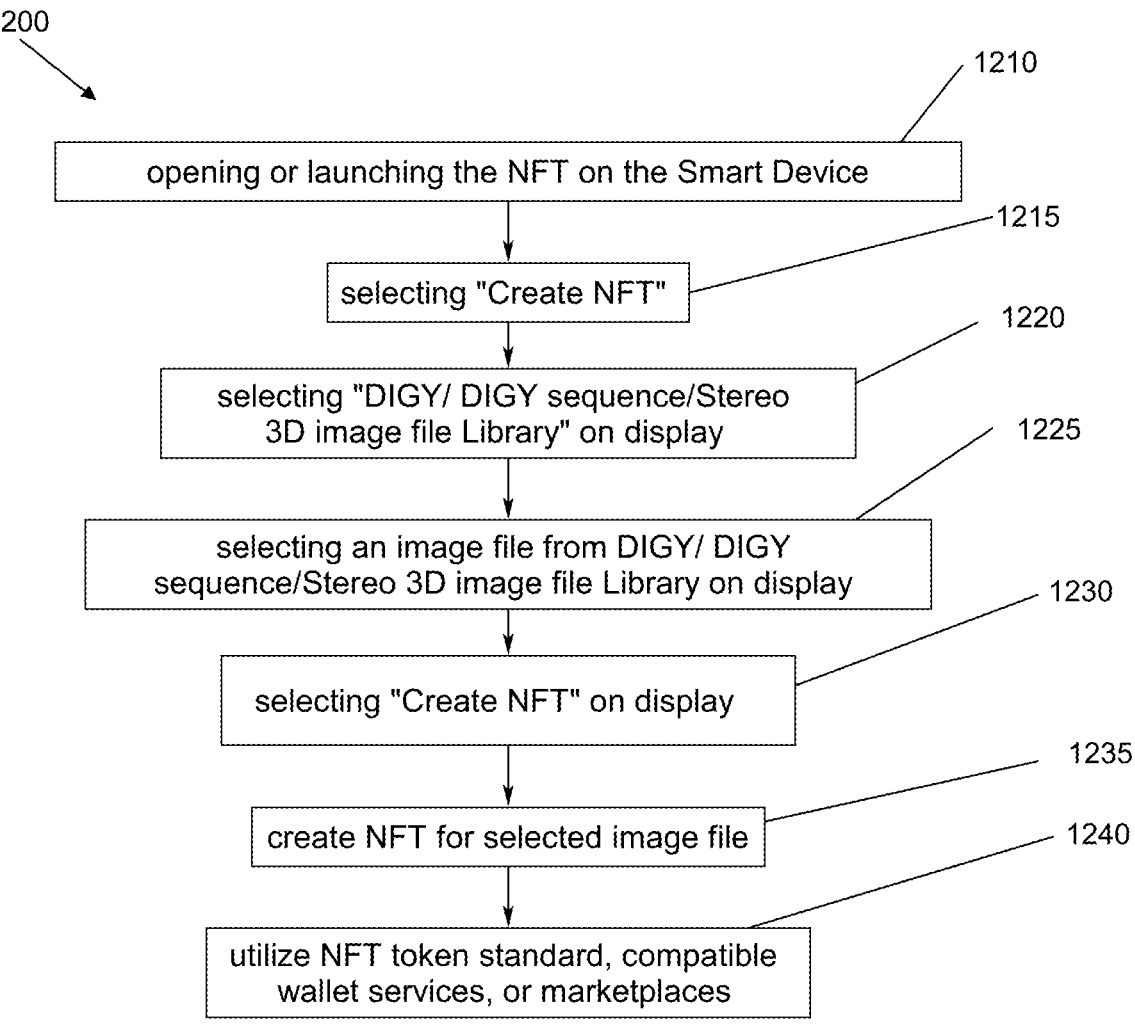
FIG. 12 is an exemplary embodiment of a flow diagram of a method of generating a non-fungible token (NFT) utilizing a computing device with image capture devices capture devices shown in FIG. 3.

Referring now to FIG. 12, there is illustrated a flow diagram 1200 of a method of creating an NFT for DIGY, DIGY sequence/Stereo 3D image file, or other data file(s) (Dataset).

In block or step 1210, opening, tapping, or launching app NFT (application program(s) 204) on Smart Device (computer system 10) represented by FIG. 8B.

In block or step 1215, tapping/touching/selecting "Create NFT" on Smart Device.

In block or step 1220, tapping/touching/selecting/accessing "DIGY, DIGY sequence/Stereo 3D image file Library" icon on display 208 to access image files or the like on Smart Device.

In block or step 1225, tapping/touching/selecting a DIGY, DIGY sequence/Stereo 3D image file, or other data file(s) (Dataset) file from Library main storage device 214 of Smart Device 10.

In block or step 1230, tapping/touching/selecting "Create NFT" on display 208 of Smart Device 10.

In block or step 1235, create NFT for selected image file—DIGY, DIGY sequence/Stereo 3D image file, or other data file(s) (Dataset). User of Smart Device 10 via a system or application 204 will utilize one of the blockchain providers to issue an NFTs for their DIGY, DIGY sequence/Stereo 3D image file, or other data file(s) (Dataset). Ethereum is currently the leading blockchain service for NFT issuance. However, there is a range of other blockchains that are becoming increasingly popular. One may be offered by Smart Device manufacture or other service provider.

In block or step 1240, utilize NFT token standard, compatible wallet services and marketplaces to offer for sale or exchange NFT of DIGY, DIGY sequence/Stereo 3D image file, or other data file(s) (Dataset). Once created user can offer their NFT, such as NFT-DIGY, DIGY sequences/Stereo 3D image file for sale or verification on NFT compatible wallet services and marketplace, such as OpenSea which is an Ethereum-based NFT marketplace. Similar marketplace may be offered by Smart Device manufacture or other service provider.

DIGY, DIGY sequence, Stereo 3D image file, or other data file(s) (Dataset) are unique in that they can't be captured by a third party device such as another smart device viewing the DIGY, DIGY sequences, or Stereo 3D since such devices do not have access to the original digital files and may not have a license to the DIGY and 3D Stereo platforms. Current NFT digital content can be captured by a third party device and mass distributed via Internet by piracy and devalue the NFT digital content of standard NFT content.

DIGY herein may include 2D video, 2D image collage, 3D DIGY.

A sequence is a plurality of DIGYS put together in series or a loop in sequence to create a story.

Referring now to FIG. 13, there is illustrated a flow diagram 1300 of a method of manipulating a DIGY or DIGY sequence image file/Stereo 3D image file to synchronize with an audio file or add thereto an audio file.

In block or step 1310, opening, tapping, or launching the app Photon3D (application program(s) 206) on display 208 of Smart Device (computer system 10) represented by FIG. 8B.

In block or step 1315, tapping/touching/selecting "Music App" via input to display 208 of Smart Device 10.

In block or step 1320, tapping/touching/selecting DIGY, DIGY sequence, Stereo 3D image file/Stereo 3D image file (Dataset) via input to display 208 of Smart Device 10 to select a Dataset file from memory device 214, 106 via an input from said display 208.

In block or step 1325, executing an instruction 206 via processor 102 to prepare, convert DIGY.gif file to DIGY.mps file via an input from said display 208; to create a DIGY frame time line via an input from display 208; to import image frames (3D DIGY, 2D Images, 2D video) into said frame time line via an input from said display 208; to adjust sequence/frame dwell time, via an input from said display 208.

In block or step 1330, executing an instruction 206 via processor 102 to record an audio files via microphone in Smart Device 10, select an audio file from memory device 214, 106 or online service, such as ITUNES via an input from said display 208 and import or download audio file to time line via an input from said display 208. It is contemplated herein that DIGY sequence and audio file may be converted to .mp4 file for sharing with other Smart Devices 222, 224 via network 250.

In block or step 1335, executing an instruction 206 via processor 102 to drag, overlay, or place audio file from memory device 214, 106 to DIGY frame time line/Stereo 3D image file via an input from display 208.

In block or step 1340, executing an instruction 206 via processor 102 to adjust, crop, link, or arrange audio file relative to DIGY image file/Stereo 3D image file via an input from display 208.

In block or step 1345, saving completed image and audio file—MP4/Stereo 3D image file and image file by tapping/ touching/selecting Save to save completed image and audio file in main storage device 214, 106 via an input from display 208.

In block or step 1350, play, viewing and listening to completed image and audio file on Smart Device (computer system 10) via an input from display 208.

In block or step 1355, sharing DIGY and audio file/Stereo 3D image and audio file may be attached to an email or text, air dropped, or uploaded to social media to share.

With respect to the above description then, it is to be realized that the optimum dimensional relationships, to include variations in size, materials, shape, form, position, movement mechanisms, function and manner of operation, assembly and use, are intended to be encompassed by the present disclosure.

With respect to the above description then, it is to be realized that the optimum dimensional relationships, to include variations in size, materials, shape, form, position, movement mechanisms, function and manner of operation, assembly and use, are intended to be encompassed by the present disclosure.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Moreover, the present disclosure has been described in detail, it should be understood that various changes, substitutions and alterations can be made thereto without departing from the spirit and scope of the disclosure as defined by the appended claims. Accordingly, the present disclosure is not limited to the specific embodiments illustrated herein but is limited only by the following claims.

The invention claimed is:

1. A combined system to capture a two dimensional digital image of a scene by a user, process the images, and view a multidimensional digital image, the combined system comprising:

a memory device for storing instructions;

a processor in communication with said memory device configured to execute said instructions;

a digital image capture device in communication with said processor configured to capture a first two dimensional digital image of the scene;

said processor executes said instructions to save said first two dimensional digital image of the scene;

said processor executes said instructions to select a key subject convergence point in said first two dimensional digital image of the scene;

said processor executes said instructions to generate a second two dimensional digital image of the scene from said first two dimensional digital image of the scene via a camera angle rotation of between 1-180 degrees of said first two dimensional digital image of the scene;

said processor executes said instructions to align said first two dimensional digital and said second two dimensional digital image of the scene horizontally and vertically;

a display in communication with said processor having a micro optical lens, said display configured to display the multidimensional digital image;

said micro optical lens having at least one layer selected from the group consisting of a plurality of pixels having a refractive element integrated therein, said refractive element having a plurality of repeating series of sub-elements aligned as a single layer therewith said plurality of pixels, said plurality of repeating series of sub-elements having repeating flat sections and trapezoid sections a lenticular lens, a barrier screen, a parabolic lens, an overlay, a waveguide, a black line, and combinations thereof;

said processor executes said instructions to interphase said first two dimensional digital and said second two dimensional digital image of the scene aligned about said key subject convergence point to correspond to said micro optical lens spacing to generate a multidimensional image of the scene; and said processor executes said instructions to display said multidimensional image of the scene on said display.

2. The system of claim 1, wherein said processor executes said instructions to generate a message on said display to instruct the user to position said digital image capture device a distance from a key subject of the scene.

3. The system of claim 1, wherein said processor executes said instructions to automatically select said key subject convergence point in said first two dimensional digital image of the scene.

4. The system of claim 1, wherein said processor executes said instructions to enable the user to select said key subject convergence point in said first two dimensional digital image via an input from said display.

5. The system of claim 1, wherein said processor executes said instructions to perform a horizontal image translation of said first two dimensional digital image of the scene.

6. The system of claim 1, wherein said processor executes said instructions to generate a depth map from said first two dimensional digital image of the scene.

7. The system of claim 1, wherein each of said plurality of repeating series of sub-elements is configured having a cross-section shaped as a single layer having repeating flat sections and trapezoid sections, each of said trapezoid sections having an incline angle and a decline angle.

8. The system of claim 6, wherein said processor executes said instructions to generate an infilled mesh from said depth map of said first two dimensional digital image of the scene.

9. The system of claim 8, wherein said processor executes said instructions to apply a parallax to said infilled mesh from said depth map of said first two dimensional digital image of the scene.

10. The system of claim 3, wherein said processor utilizes artificial intelligence (AI) to automatically select said key subject convergence point in said first two dimensional digital image of the scene.

11. The system of claim 1, wherein said processor utilizes artificial intelligence (AI) to generate said second two dimensional digital image of the scene from said first two dimensional digital image of the scene via a camera angle rotation of between 1-180 degrees of said first two dimensional digital image of the scene.

12. The system of claim 1, wherein said processor executes said instructions to record an audio file via a microphone in communication with said processor.

13. The system of claim 12, wherein said processor executes said instructions to save said audio file to said memory.

14. The system of claim 13, wherein said processor executes said instructions to select a multidimensional digital image from said memory via an input from said display and to display said multidimensional digital image on said display.

15. The system of claim 14, wherein said processor executes said instructions to select an audio file from said memory via an input from said display and to overlay said audio file on said multidimensional digital image on said display.

16. The system of claim 15, wherein said processor executes said instructions to crop said audio file to align therewith said multidimensional digital image via an input from said display.

17. The system of claim 16, wherein said processor executes said instructions to save said audio file and said multidimensional digital image via an input from said display.

18. The system of claim 1, wherein said processor executes said instructions to save said multidimensional digital image via an input from said display.

19. The system of claim 18, wherein said processor executes said instructions to play said audio file and display said multidimensional digital image via an input from said display.

20. The system of claim 18, wherein said processor executes said instructions to share said multidimensional digital image with a second processor via an input from said display.

21. The system of claim 20, wherein said processor executes said instructions to display said multidimensional digital image via an input from said display.

22. The system of claim 17, wherein said processor executes said instructions to share said audio file and said multidimensional digital image via an input from said display with a second processor via an input from said display.

23. The system of claim 17, wherein said processor executes said instructions to generate a non-fungible token of said audio file and said multidimensional digital via an input from said display.

24. The system of claim 18, wherein said processor executes said instructions to generate a non-fungible token of said multidimensional digital via an input from said display.

25. The system of claim 23, wherein said processor executes said instructions to utilize a wallet service and a marketplace to exchange said non-fungible token of said audio file and said multidimensional digital image via an input from said display.

26. The system of claim 24, wherein said processor executes said instructions to utilize a wallet service and a marketplace to exchange said non-fungible token of said multidimensional digital image via an input from said display.

* * * * *